United States Patent [19]

Aihara et al.

[11] Patent Number: 4,977,743
[45] Date of Patent: Dec. 18, 1990

[54] COOLING CONTROL SYSTEM FOR INTERNAL COMBUSTION ENGINES EQUIPPED WITH SUPERCHARGERS

[75] Inventors: Yasuyuki Aihara; Shigeki Baba; Chiharu Shimizu; Eitetsu Akiyama, all of Wako, Japan

[73] Assignee: Honda Giken Kogyo Kabushiki Kaisha, Tokyo, Japan

[21] Appl. No.: 290,174

[22] Filed: Dec. 23, 1988

[30] Foreign Application Priority Data

| Dec. 28, 1987 | [JP] | Japan | 62-199413[U] |
| Dec. 28, 1987 | [JP] | Japan | 62-332918 |
| Dec. 28, 1987 | [JP] | Japan | 62-332919 |
| Dec. 28, 1987 | [JP] | Japan | 62-332920 |
| Dec. 28, 1987 | [JP] | Japan | 62-199412[U] |
| Dec. 28, 1987 | [JP] | Japan | 62-332921 |
| Dec. 28, 1987 | [JP] | Japan | 62-332922 |
| Dec. 28, 1987 | [JP] | Japan | 62-199410[U] |
| Dec. 28, 1987 | [JP] | Japan | 62-199411[U] |
| Jun. 3, 1988 | [JP] | Japan | 63-138075 |

[51] Int. Cl.$^5$ .................. F01P 3/20; F01P 7/08
[52] U.S. Cl. ................. 60/605.3; 123/41.49; 123/41.31
[58] Field of Search ........... 60/605.1, 605.3; 123/41.31, 41.44, 41.49

[56] References Cited

U.S. PATENT DOCUMENTS

| 3,827,236 | 8/1974 | Rust | 60/605.3 X |
| 4,499,865 | 2/1985 | Charles | 123/41.49 X |
| 4,774,910 | 10/1988 | Aihara et al. | 123/41.49 X |

FOREIGN PATENT DOCUMENTS

| 96367 | 12/1983 | European Pat. Off. | 60/605.3 |
| 34101 | 8/1980 | Japan . | |
| 191415 | 11/1982 | Japan . | |
| 105029 | 7/1984 | Japan . | |
| 261931 | 12/1985 | Japan | 60/605.3 |
| 2120414 | 11/1983 | United Kingdom | 60/605.3 |

Primary Examiner—Michael Koczo
Attorney, Agent, or Firm—Lyon & Lyon

[57] ABSTRACT

A cooling control system for an internal combustion engine equipped with a supercharger. The control system includes an electrically-driven pump for circulating coolant for cooling the supercharger, and an electrically-driven fan arranged in an engine room. The cooling control system controls the operation of the electrically-driven pump and the operation of the electrically-driven fan, based on an output from a sensor for detecting stoppage of the engine as well as on operation of a timer for counting a predetermined time period. The cooling control system controls, during operation of the engine, the operation of the electrically-driven pump and the operation of the electrically-driven fan, based on an output from a sensor or sensors for detecting operating conditions of the engine.

28 Claims, 19 Drawing Sheets

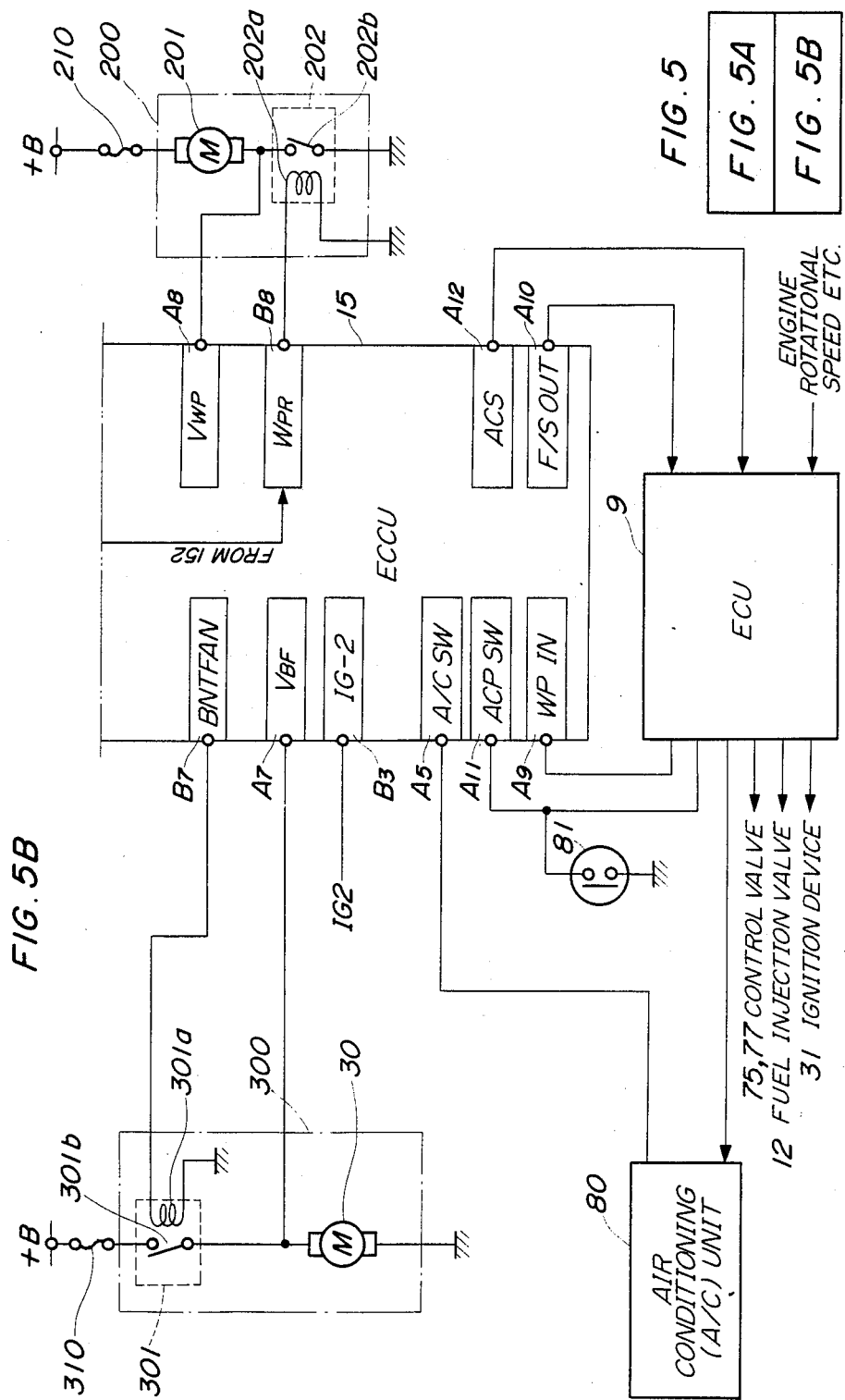

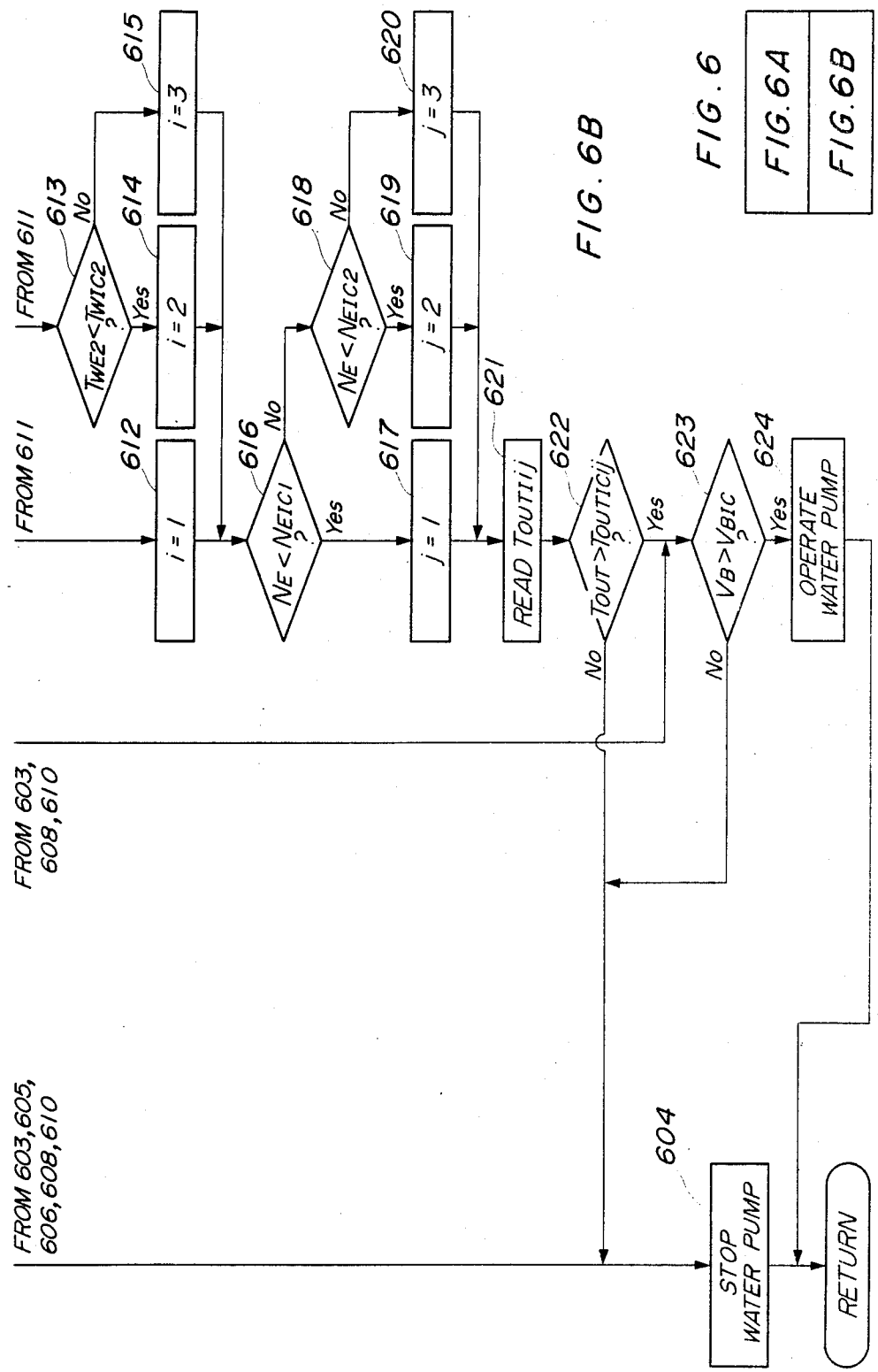

FIG. 7

| j=3 | | TOUTIC13 | TOUTIC23 | TOUTIC33 |
|---|---|---|---|---|
| | — NEIC2 | | | |
| j=2 | | TOUTIC12 | TOUTIC22 | TOUTIC32 |
| | — NEIC1 | | | |
| j=1 | | TOUTIC11 | TOUTIC21 | TOUTIC31 |

TWIC1　　TWIC2

|— i=1 —|— i=2 —|— i=3 —|

FIG. 17
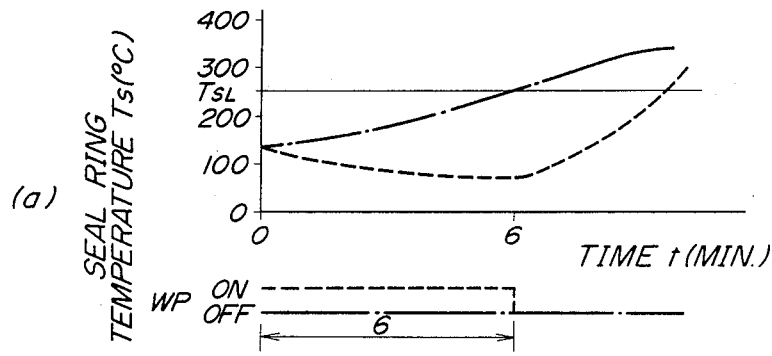
(a)
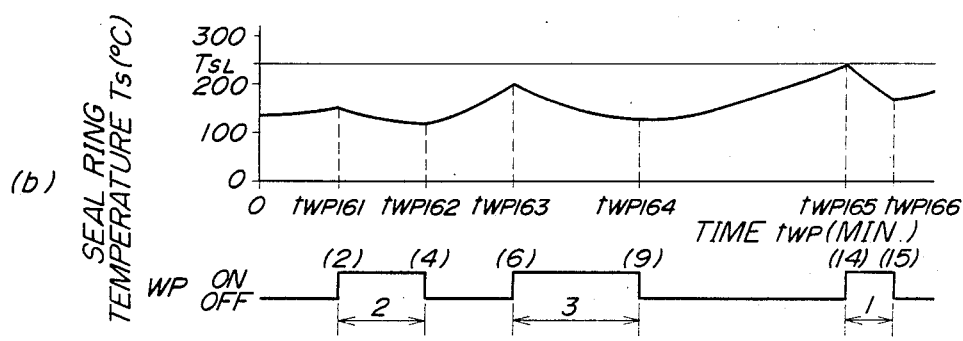
(b)
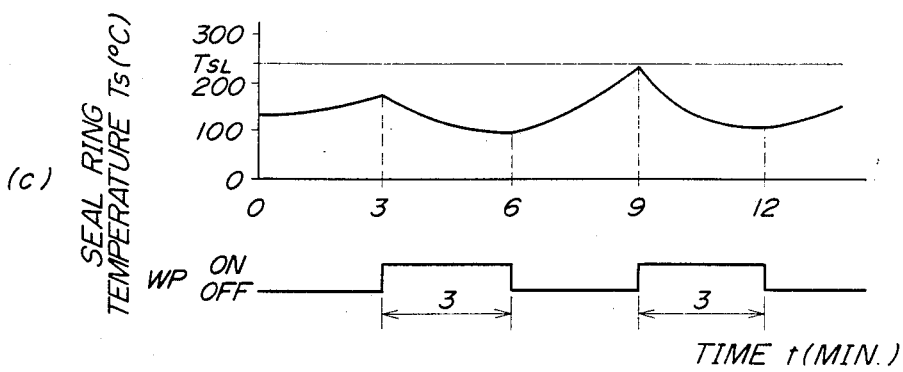
(c)

COOLING CONTROL SYSTEM FOR INTERNAL COMBUSTION ENGINES EQUIPPED WITH SUPERCHARGERS

BACKGROUND OF THE INVENTION

The invention relates to a cooling control system for an internal combustion engine equipped with a supercharger, which controls cooling of the engine, supercharger, etc. in an improved manner.

Some internal combustion engines for automotive vehicles have a turbocharger arranged in the intake passage thereof as a supercharger for enhancing the engine output.

In an engine equipped with this type of supercharger, the temperature of the turbocharger increases during operation thereof, which may cause thermal damage to engine components, such as seizure of bearings and carbonization of lubricating oil and hence degradation of its lubricity. A cooling control system for a water-cooled type turbocharger, which is intended to prevent the thermal damage, is conventionally known. The cooling control system is adapted to drive a pump to cause cooling water to circulate through the turbocharger during operation of the engine to thereby water-cool the turbocharger.

Further, a cooling control system of this type has been proposed, for example, by Japanese Provisional Utility Model Publication (Kokai) No. 59105029, in which a pump is driven for water-cooling the turbocharger for a predetermined time period after stoppage of the engine in order to prevent the thermal damage which tends to occur after stoppage of the engine since the turbocharger continues to rotate by inertia after stoppage of the engine to thereby rise in temperature.

However, the proposed cooling control system is constructed such that simultaneously when the ignition switch of the engine is turned off, the pump is started to operate and supply the turbocharger with cooling water over the predetermined time period immediately after stoppage of the engine. Therefore, the pump is driven for operation even when the turbocharger does not require cooling by water circulated by the pump.

More specifically, the thermal damage described above due to high temperature of the turbocharger after stoppage of the engine tends to occur when the engine is stopped after being operated under a medium or high load. Therefore, when the engine has been stopped after being operated under a medium or high load, the necessity to cool the turbocharger by circulating the cooling water by the pump is high for positive prevention of the thermal damage. However, if the engine has been under a low load condition before stoppage of the engine, it is not very necessary to cool the turbocharger after stoppage of the engine since the temperature of the engine is not very high. Therefore, the above proposed system which cools the turbocharger through driving of the pump after stoppage of the engine may not always meet actual thermal conditions of the engine and turbocharger.

Further, according to the above proposed cooling control system, the control of cooling of the turbocharger is carried out while the engine is in stoppage, i.e. while the battery installed on the vehicle is not charged with electricity. Therefore, unnecessary driving of the pump results in wasteful consumption of the battery.

The temperature of the turbocharger on and after stoppage of the engine depends, on an operating condition in which the engine has been immediately before stoppage, such as load on the engine and ambient temperature, and may vary according to different cases. Therefore, even if the temperature of the turbocharger on stoppage of the engine is identical between the cases, the rise in the temperature of same thereafter can be different from each other.

In particular, the degree of rise in the temperature of the turbocharger after stoppage of the engine largely depends on the load on the engine applied immediately before stoppage thereof. That is, it is larger and hence is more liable to cause the thermal damage as the load on the engine immediately before stoppage is higher. Further, the temperature of the turbocharger on stoppage of the engine not only depends on the load on the engine immediately before stoppage but also on external factors such as air streams produced by running of the vehicle and cooling the turbocharger, capacity of the radiator fan, etc. to a large extent. The degree of dependency on the external factors is large particularly in the case where the temperature of the turbocharger is detected by the use of cooling water temperature, since the specific heat of cooling water is small.

However, in the aforesaid conventional cooling control system the pump is driven over the predetermined time period, depending on the temperature of the turbocharger on stoppage of the engine, the temperature of same being influenced by external factors as above. Specifically, when the detected temperature is higher than a predetermined value, the predetermined time period is set to a constant value, while when the detected temperature is lower than the predetermined value, the predetermined time period is set to 0, that is, the pump is not driven. Therefore, it is impossible to carry out cooling control in response to the load condition of the engine immediately before stoppage of the engine. Further, it is impossible to drive the pump to just a sufficient extent depending on different manners of rise in the temperature of the turbocharger after stoppage of the engine. If the predetermined time period is set to a longer time period for prevention of the thermal damage, in case that the temperature of the turbocharger rises to the maximum possible degree after stoppage of the engine, the pump will be driven for an excessively long time period even when the turbocharger temperature actually rises to a lower degree than expected, which will result in wasteful consumption of the battery. On the other hand, if the predetermined time period is set to a shorter value for prevention of such wasteful battery consumption, it is impossible to prevent the thermal damage when the turbocharger temperature actually rises to a higher degree.

Further, the aforesaid conventional cooling control system is not provided with a fail-safe function against malfunction of its component parts or related devices. If the pump goes out of order, for example, the turbocharger may suffer from seizure etc. i.e. inoperativeness of the turbocharger itself resulting from malfunction of the cooling system therefor.

In the meanwhile, an engine-room cooling control system has been conventionally proposed by Japanese Utility Model Publication (Kokoku) No. 55-34101, in which an electric fan is arranged in the engine room to be operated or stopped depending on the temperature of the engine room and that of the engine, so that the temperature of the engine room may be controlled to a proper value to thereby prevent thermal damage to the engine such as overheating of the engine and vapor locking of fuel.

However, this cooling control system has disadvantages such that if the engine is equipped with a turbocharger, the temperature of the turbocharger and that of the engine room cannot be properly controlled after stoppage of the engine.

More specifically, the conventional cooling control system is constructed such that the control of operation of the electric fan responsive to the engine room temperature etc. is carried out only during operation of the engine, so that it is impossible to prevent rise in the temperature of the turbocharger after stoppage of the engine, and hence to prevent thermal damage to the turbocharger. Further, since the engine room temperature also rises with rise in the temperature of the turbocharger which is a heat source in the engine room, it is impossible to prevent the above-described thermal damage to the engine.

A cooling control system is also known in which a control device is provided separately from a control device for controlling the engine itself, for controlling the operation of a cooling device which cools the engine, in response to an output of a sensor for detecting operating conditions of the engine whereby the engine is cooled to just a sufficient extent so as to prevent excessive rise in the engine temperature. A cooling control system of this type has been proposed by Japanese Provisional Patent Publication (Kokai) No. 57-191415 in which an electric fan is provided which operates in the event of malfunction of a driving device for a water pump as the cooling device or malfunction of the first-mentioned control device to air-cool the engine even during the malfuction to thereby prevent rise in the engine temperature.

However, in this cooling control system, the water pump and the electric fan ar intended for cooling the engine alone. Therefore, if the control system is applied to an engine equipped with a turbocharger, it is impossible to prevent excessive rise in the temperature of the turbocharger, and hence excessive rise in the temperature of the engine due to rise in the temperature of the turbocharger, which is one of main heat sources in the engine room, and therefore the proper performance or sufficient durability of the engine may not be obtained.

SUMMARY OF THE INVENTION

It is an object of the invention to provide a cooling control system for an internal combustion engine equipped with a turbocharger which is capable of properly controlling the temperature of the turbocharger after stoppage of the engine to thereby prevent thermal damage to the engine and the turbocharger and wasteful consumption of the battery and carry out efficient cooling of the engine.

It is a further object of the invention to provide a cooling control system for an internal combustion engine equipped with a turbocharger, which is capable of properly carrying out the cooling control depending on the load on the engine immediately before stoppage thereof and the degree of rise in the temperature of the turbocharger after stoppage of the engine.

It is another object of the invention to provide a cooling control system for an internal combustion engine equipped with a turbocharger, which is capable of properly controlling the temperature of the turbocharger and that of the engine room to thereby prevent thermal damages to the turbocharger and the engine.

It is still another object of the invention to provide a cooling control system for an internal combustion engine equipped with a turbocharger, which is capable of preventing excessive temperature rise of the turbocharger and the engine room even in the event of malfunction occurring in sensors, a control device, or cooling devices used in effecting the cooling control.

According to a first aspect of the invention, there is provided a cooling control system for an internal combustion engine having a supercharger, and an engine room accommodating the supercharger, comprising:

sensor means for detecting stoppage of the engine;

pump means for supplying coolant for cooling the supercharger;

pump driving means for electrically driving the pump means;

cooling fan means arranged in the engine room;

fan driving means for electrically driving the cooling fan means;

timer means for determining whether or not at least one predetermined time period has elapsed and control means for controlling the pump driving means and the fan driving means in a manner such that operation of the pump means and operation of the cooling fan means are controlled based on a result of detection by the sensor means and a result of determination by the timer means.

Preferably, the engine includes a first cooling system for cooling the engine, and a second cooling system for cooling the supercharger, and the pump means is arranged in the second cooling system.

More preferably, the cooling control system includes second sensor means for detecting a parameter representative of a temperature of a predetermined system of the engine. Advantageously, the second sensor means may comprise at least one of first coolant temperature detecting means for detecting the temperature of the coolant at a location downstream of the supercharger in the second cooling system, oil temperature detecting means for detecting the temperature of lubricating oil in the engine as the parameter representative of the temperature of the predetermined system of the engine, and second coolant temperature detecting means for detecting the temperature of coolant in the first cooling system for cooling the engine.

Preferably, the cooling control system includes means for operating the timer means in such a manner that the timer means counts a predetermined time period after the first-mentioned sensor means has detected stoppage of the engine, and means for controlling the pump driving means in such a manner that the pump means is intermittently driven in accordance with the counting by the timer means.

Preferably, the control means controls at least one of the pump driving means and the fan driving means in accordance with an output from the second sensor means.

Preferably, the control means operates the pump driving means when coolant temperature detected by one of the first and second coolant temperature detecting means is above a predetermined value.

Preferably, the timer means starts counting a predetermined time period when the first-mentioned sensor means has detected stoppage of the engine, and the control means operates the pump driving means over the predetermined time period which is counted by the timer means when the temperature detected by the second sensor means is above a predetermined value.

Preferably, the control means controls the pump driving means in accordance with outputs of coolant temperature detecting means for detecting the coolant temperature at a location downstream of the supercharger and lubricating oil temperature detecting means.

Preferably, the control means controls at least one of the pump driving means and the fan driving means in accordance with both an output from coolant temperature detecting means for detecting the coolant temperature at a location downstream of the supercharger obtained at the time the first-mentioned sensor means detects stoppage of the engine and an output from the coolant temperature detecting means obtained at the time a predetermined time period has elapsed after the stoppage of the engine.

Preferably, the operation of the engine is controlled by second control means and the firstmentioned control means is capable of carrying out control of the pump driving means and the fan driving means independently of the second control means after stoppage of the engine.

In a typical form of the invention, the cooling fan means comprises a radiator fan for cooling the engine, and a cooling fan for cooling the engine room. Advantageously, the control means causes the radiator fan to rotate in a directing such that air in the engine room is discharged to the outside thereof.

Further advantageously, the control means includes means for controlling the fan driving means during operation of the engine such that the cooling fan starts cooling in advance before stoppage of the engine when the temperature of the coolant detected by the first coolant temperature detecting means is above a predetermined value.

Preferably, the fan driving means comprises first and second fan driving means for driving the radiator fan and the cooling fans, respectively, and the control means controls the first and second fan driving means in accordance with outputs from the first coolant temperature detecting means and oil temperature detecting means after the first-mentioned sensor means detects stoppage of the engine.

In case that abnormality occurs in the cooling control system, the cooling control system may include fail-safe means operable to cause at least one of the pump means and the cooling fan means to operate when abnormality occurs in at least one of the second sensor means and the control means.

Preferably, the cooling control system includes fail-safe means operable when abnormality occurs in the first-mentioned control means, for operating the fan driving means to drive the cooling fan means.

In another form of fail-safe arrangement, the second control means comprises engine output control means for controlling the output of the engine, the first-mentioned control means being associated with the engine output control means in such a manner that the first-mentioned control means supplies the engine output control means with a predetermined fail-safe signal when abnormality occurs in the cooling control system, the engine output control means being responsive to the predetermined fail-safe signal for controlling the output of the engine in a manner such that the output of the engine is decreased.

Preferably, the engine output control means decreases the output of the engine by cutting off the supply of fuel to the engine, or by retarding the timing of ignition of an ignition device of the engine, or by decreasing supercharging pressure produced by the supercharger.

According to a second aspect of the invention, there is provided a cooling control system for an internal combustion engine having a supercharger, and an engine room accommodating the supercharger, comprising:

cooling means including pump means for supplying coolant to the supercharger, and cooling fan means arranged in the engine room of the engine;

driving means including pump driving means for electrically driving the pump means, and fan driving means for electrically driving the cooling fan means;

engine operating condition detecting means for detecting operating conditions of the engine, the engine operating condition detecting means including at least one temperature detecting means and control means for controlling the pump driving means and the fan driving means, based on an output from the engine operating condition detecting means, to operate the pump means and the cooling fan means during operation of the engine.

Preferably, in the second aspect, the engine has a first cooling system for cooling the engine, and a second cooling system for cooling the supercharger, and the pump means is arranged in the second cooling system.

Preferably, the temperature detecting means comprises one of coolant temperature detecting means for detecting the temperature of coolant in the first cooling system for cooling the engine, oil temperature detecting means for detecting the temperature of lubricating oil in the engine, and coolant temperature detecting means for detecting temperature of coolant at a location downstream of the supercharger in the second cooling system.

Preferably, the cooling fan means of the cooling means comprises a radiator fan for cooling the engine, and a cooling fan for cooling the engine room.

Preferably, the cooling control system includes fail-safe means which operable to cause the cooling means to operate when abnormality occurs in at least one of the engine operating condition detecting means and the control means.

Preferably, the cooling means cools at least one of the supercharger and the intercooler.

In a specific form of the fail-safe means of the second aspect, the fail-safe means compares a temperature of the engine with at least one predetermined value, and controls the driving means based upon a result of the comparison, the fail-safe means changing the at least one predetermined value such that the cooling means can operate within an expanded range of the temperature of the engine when abnormality occurs in the engine operating condition detecting means.

More preferably, the fail-safe means controls the pump driving means based upon a result of the comparison, and changes the at least one predetermined value such that the pump means can operate within an expanded range of the temperature of the engine when abnormality occurs in the engine operating condition detecting means.

More preferably, the fail-safe means causes the cooling fan means of the cooling means to operate when abnormality occurs in the engine operating condition detecting means.

The fail-safe means may comprise an analog circuit which causes the cooling means to operate, when abnormality occurs in the control means.

Preferably, the analog circuit causes both the pump means and the cooling fan means of the cooling means to operate.

In another form of fail-safe arrangement, the control means is associated with engine output control means for controlling the output of the engine in such a manner that the control means supplies the engine output control means with a predetermined fail-safe signal when abnormality occurs in the cooling control system, the engine output control means being responsive to the predetermined fail-safe signal for controlling the output of the engine in a manner such that the output of the engine is decreased.

Preferably, the control means causes the engine output control means to decrease the output of the engine when the coolant temperature at a location downstream of the supercharger detected by the coolant temperature detecting means is above a predetermined value.

The above and other objects, features, and advantages of the invention will be more apparent from the ensuing detailed description taken in conjunction with the accompanying drawings.

BRIEF DESCRIPTION OF THE DRAWINGS

FIGS. 5A and 5B are a wiring diagram showing the external connections of an electronic cooling control unit appearing in FIG. 1;

FIGS. 6A and 6B are a flowchart showing a subroutine for controlling the operation of a water pump in FIG. 1;

FIG. 7 is a diagram showing a map which is applied to the subroutine of FIG. 6;

FIGS. 17(a), (b) and (c) is a diagram showing the relationship between the operation of the water pump and the temperature of a seal ring of the turbocharger;

DETAILED DESCRIPTION

The invention will now be described in detail with reference to the drawings showing embodiments thereof.

Figure 1:
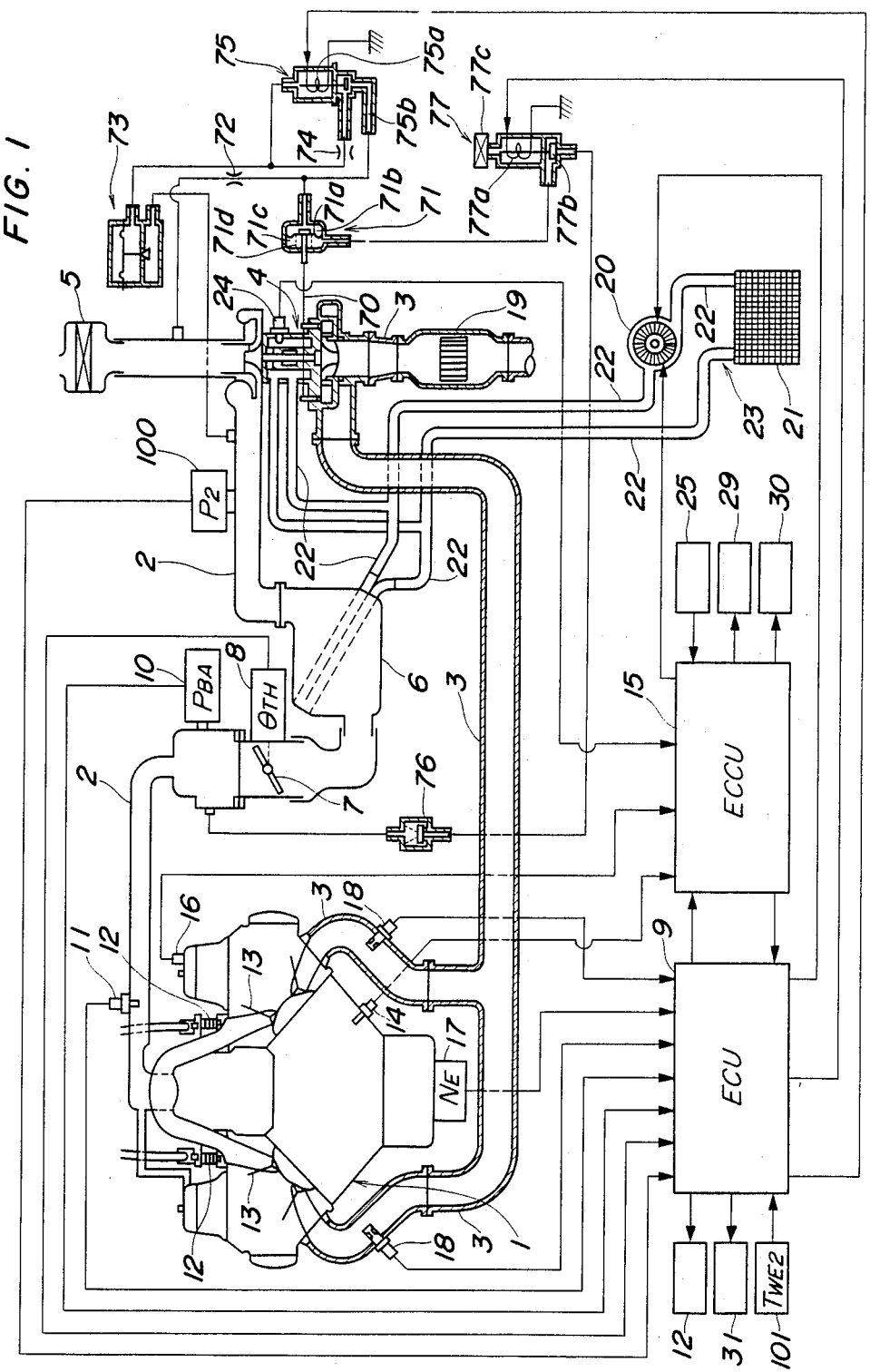
FIG. 1 is a schematic diagram of the whole arrangement of a fuel supply control system of an internal combustion engine equipped with a turbocharger, to which the cooling control system according to the invention is applied.

Referring first to FIG. 1, there is illustrated the whole arrangement of a fuel supply control system for an internal combustion engine equipped with a supercharger, to which the cooling control system according to the invention is applied. In the figure, the engine is equipped with a water-cooled turbocharger. Reference numeral 1 designates an internal combustion engine which may be a six-cylinder type, for instance. The engine has an intake pipe 2 connected to an upstream side thereof, and an exhaust pipe 3 connected to a downstream side thereof. The turbocharger 4 is arranged intermediately between the intake pipe 2 and the exhaust pipe 3.

In the intake pipe 2, there are provide an air-cleaner 5, an intercooler 6, and a throttle valve 7 in the order mentioned as viewed from the upstream side.

A supercharging pressure ($P_2$) sensor 100 is arranged between the turbocharger 4 and the intercooler 6, and supplies a signal indicative of the detected supercharging pressure to an electronic control unit (hereinafter referred to as "the ECU") 9.

Connected to the throttle valve 7 is a throttle valve opening ($\theta$th) sensor 8, which detects the throttle valve opening ($\theta$th), converts the detected throttle valve opening ($\theta$th) into an electrical signal, and supplies the signal to the ECU 9.

Arranged at a location downstream of the throttle valve 7 is an intake pipe absolute pressure ($P_{BA}$) sensor 10, which detects absolute pressure in the intake pipe, converts the detected intake pipe absolute pressure ($P_{BA}$) into an electrical signal, and supplies the signal to the ECU 9. An intake air temperature ($T_A$) sensor 11 is provided at a location downstream of the intake pipe absolute pressure ($P_{BA}$) sensor 10, which detects intake air temperature ($T_A$); and supplies a signal indicative of the detected temperature ($T_A$) to the ECU 9.

Fuel injection valves 12, two of which are shown, are arranged in the intake pipe 2 intermediately between the engine 1 and the throttle valve 7, each at a location slightly upstream of a corresponding intake valve 13, for each cylinder. Each fuel injection valve is connected to a fuel tank, not shown, and also electrically connected to the ECU 9 so that its opening valve period, i.e. the amount of fuel to be supplied to the engine 1, is controlled by a driving signal from the ECU 9.

First and second engine coolant temperature ($T_W$) sensors (hereinafter respectively referred to as "the $T_{WE1}$ sensor" and "the $T_{WE2}$ sensor") 14, 101, which may be formed of a thermistor or the like, are mounted in the cylinder block of the engine in a manner embedded in the peripheral wall of an engine cylinder having its interior filled with coolant, to detect engine coolant temperature ($T_W$), and supply electrical signals indicative of the detected engine coolant temperature ($T_W$) to an electronic cooling control unit for controlling the cooling of the engine room (hereinafter referred to as "the ECCU") described below and the ECU 9, respectively.

A lubricating oil temperature sensor (hereinafter referred to as "the $T_{OIL}$ sensor") for detecting lubricating oil temperature is mounted in the cylinder block of the engine 1, and supplies a signal indicative of the detected lubricating oil temperature to the ECCU 15.

An engine rotational speed speed sensor (hereinafter referred to as "the Ne sensor") 17 is arranged in facing relation to a camshaft, not shown, of the engine 1 or a crankshaft, not shown, of same. The Ne sensor is adapted to generate a pulse of a topdead-center (TD) position signal (hereinafter referred to as "the TDC signal") at a predetermined crank angle position of each cylinder of the engine which comes a predetermined crank angle earlier relative to the top-dead-center (TDC) position at which the suction stroke thereof starts, whenever the engine crankshaft rotates through 120 degrees. The TDC signal pulses generated by the Ne sensor are supplied to the ECU 9.

$O_2$ sensors 18, 18 are inserted in the exhaust pipe 3 at locations immediately downstream of the engine 1 for detecting the concentration of oxygen ($O_2$) in the exhaust gases and supplying an electrical signal indicative of the detected oxygen concentration to the ECU 9. At a location downstream of the turbocharger 4 in the exhaust pipe 3, there is arranged a three-way catalyst 19 for purifying ingredients HC, CO, NOx contained in the exhaust gases.

The turbocharger 4 is, as described in detail hereinbelow, a variable capacity type, to which is connected a conduit line 22 across which are provided a water pump 20 and a subradiator 21. More specifically, the water pump 20, the subradiator 21 and the conduit line 22 cooperate to form a cooling system 23 for cooling the water-cooled turbocharger which is provided independently of a cooling system, not shown, for cooling the engine 1. Cooling water or coolant supplied by the cooling system 23 circulates in a water jacket 57 (shown in FIG. 3) formed within a lubricating part casing 43, referred to hereinafter, of the turbocharger 4 to thereby cool the turbocharger 4. Further, the conduit line 22 is bifurcated into two branches, one of which extends through the intercooler 6 for cooling the intake air taken in through the intercooler 6. In the cooling system 23, at a location immediately downstream of the turbocharger 4, there is arranged a turbocharger coolant temperature sensor (hereinafter referred to as "the $T_{WT}$ sensor") 24 for detecting the temperature of coolant for the turbocharger and supplying an electrical signal indicative of the detected turbocharger-coolant temperature to the ECCU 15. An ignition switch 25 is also electrically connected to the ECCU 15 to supply same with an electrical signal indicative of the ON or OFF state of the ignition switch 25.

Figure 2:
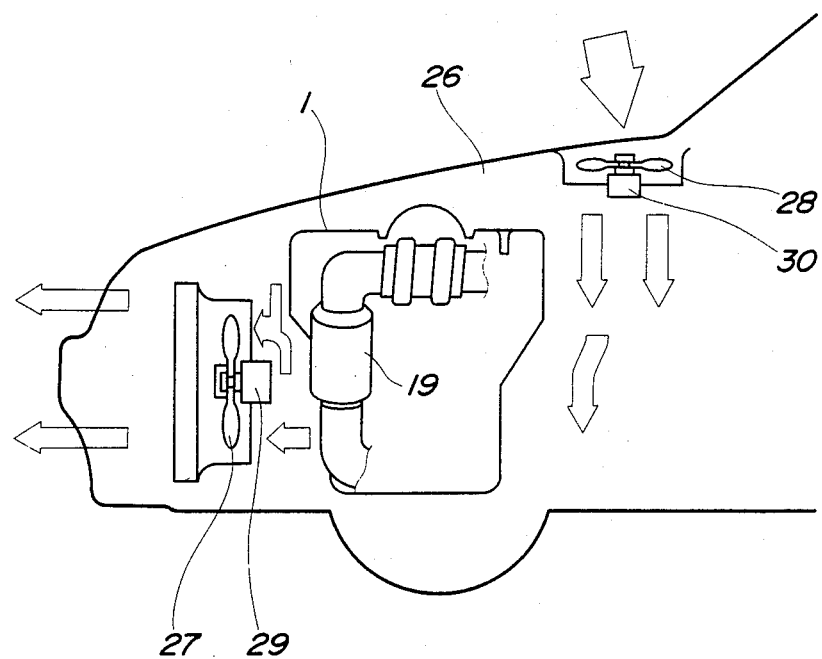
FIG. 2, is a schematic diagram illustrating an engine room of an automotive vehicle on which the engine of FIG. 1 is installed.

Further, as shown in FIG. 2, within the engine room 26, a radiator fan 27 is arranged at a front portion thereof for blowing air in the forward or backward direction, and a bonnet fan 28 is arranged at a rear upper portion thereof for blowing air in the downward direction. The radiator fan 27 is driven by a first motor 29, and can be adjusted with respect to the direction and speed of rotation of the fan. The bonnet fan 28 is driven by a second motor 30.

Figure 3:
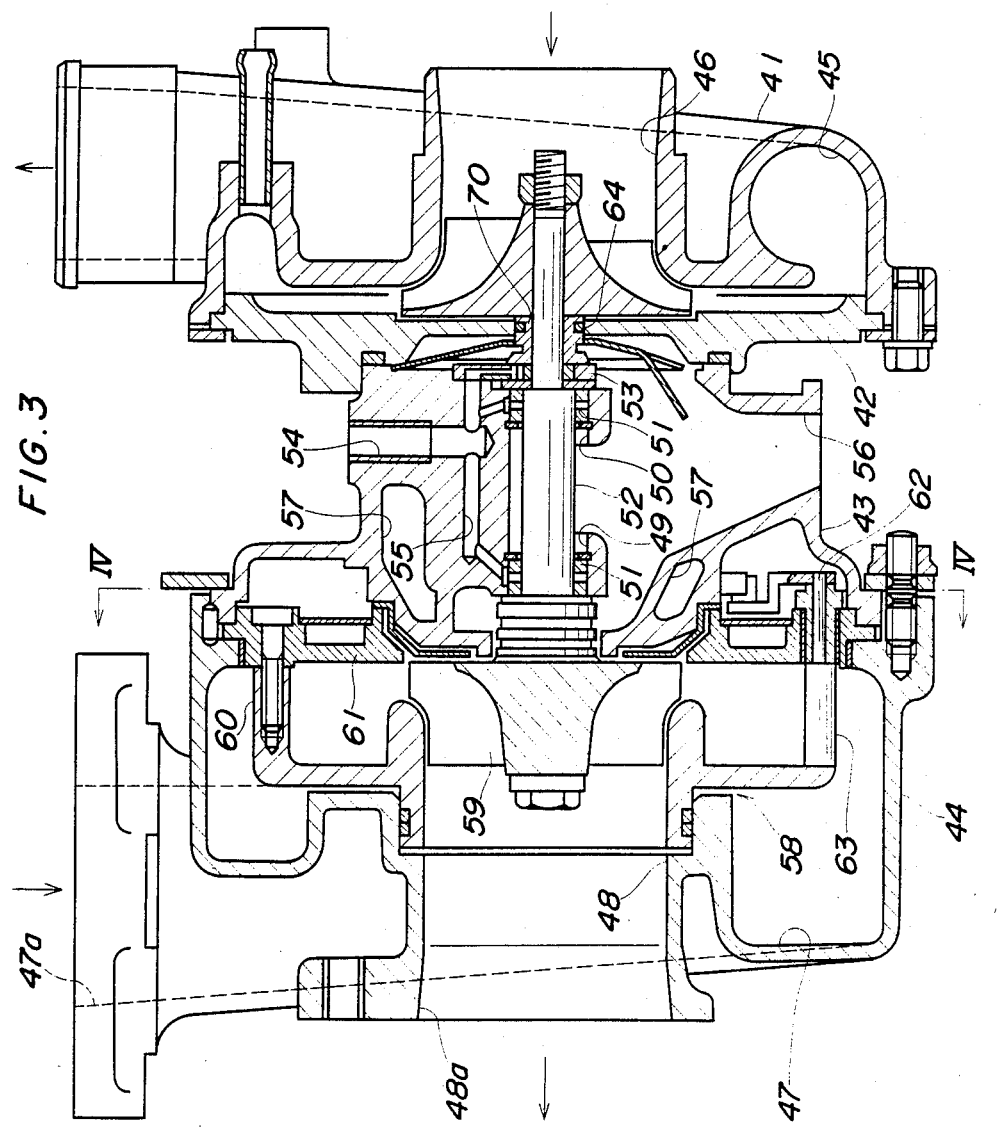
FIG. 3 is a longitudinal cross-sectional view of a turbocharger appearing in FIG. 1.

FIG. 3 shows the whole construction of the turbocharger 4, which comprises a housing formed of a compressor casing 41 constituting a scroll of a compressor part, and a back plate 42 closing the back side of the compressor casing 41, the aforementioned lubricating part casing 43 supporting therein a main shaft 52 of the turbocharger 4, and a turbine casing 44 constituting a scroll of a turbine part.

The compressor casing 41 is formed therein with a scroll passage 45 connected to the intake pipe 2, and an axial passage 46, the former serving as an intake air outlet and the latter as an intake air inlet.

The turbine casing 44 is formed therein with a scroll passage 47 having an inlet opening 47a tangentially extending thereto, an outlet passage 48 which extends in an axial direction and has an outlet opening 48a, with the inlet opening 47a and the outlet opening 48a being connected to the exhaust pipe 3.

Bearing holes 49, 50 are formed in the lubricating part casing 43, in which the main shaft 52 is received and supported, by radial bearings 51, 51. A thrust bearing 53 is interposed between the back plate 42 and an opposed end face of the lubricating casing 43.

A lubricating oil inlet port 54 is formed in an upper side portion, as viewed in FIG. 3, of the lubricating part casing 43 for delivering lubricating oil which is supplied from a lubricating oil pump, not shown, so as to be commonly used for the turbocharger 4 and the engine 1, to the radial bearings 51, 51 and the thrust bearing 53 by way of a lubricating oil passage 55 formed in the lubricating part casing 43. Lubricating oil from lubricated parts is drained through a lubricating oil outlet port 56 formed in the lubricating part casing 43, and collected into an oil sump, not shown.

In order to prevent the lubricating oil supplied to the thrust bearing 53 from flowing into the compressor side, a seal ring 64 is provided in a through hole formed in a central portion of the back plate 42 through which a bushing 70 fitted on the main shaft 52 extends.

The water jacket 57 is formed within the lubricating part casing 43. The water jacket 57 has an annular cross-section at a portion closer to the turbine casing 44, and U-shaped cross-section at a portion corresponding to an upper side portion of the lubricating part casing 43 as viewed from FIG. 3, and is connected, to the conduit line 22 extending from the cooling system 23 for the turbocharger 4 so that cooling water circulates therein to thereby cool the turbocharger 4.

Figure 4:
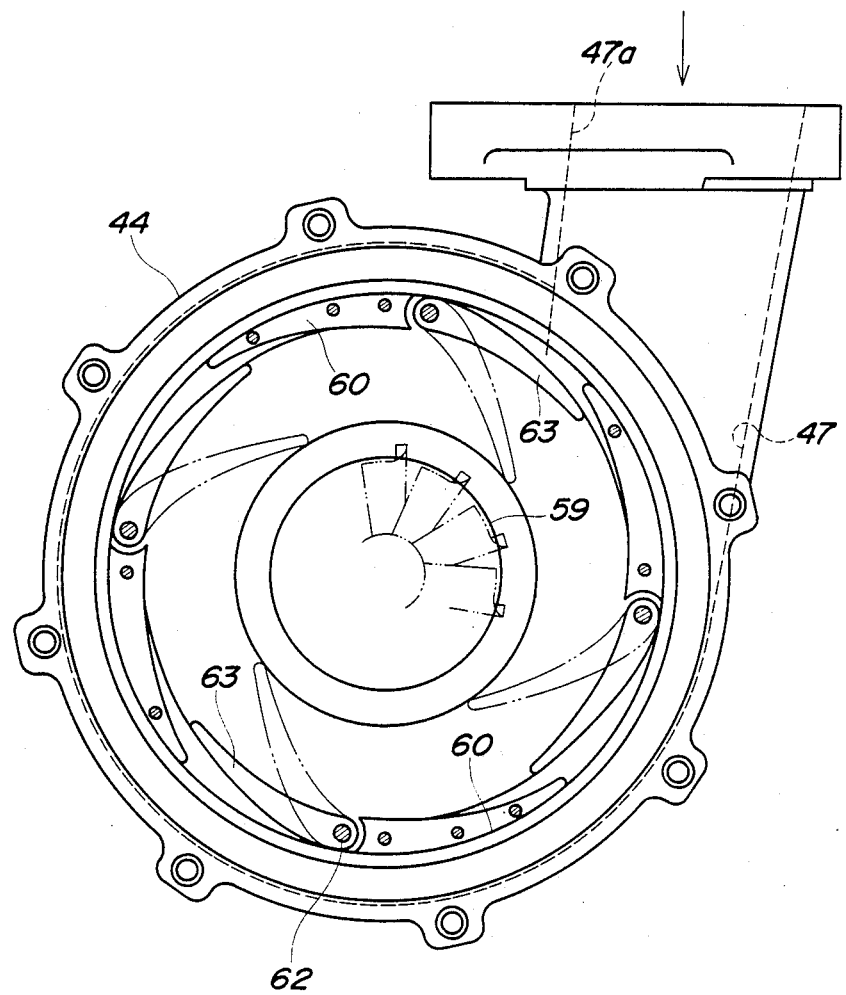
FIG. 4 is a transverse cross-sectional view taken on line IV—IV of FIG. 3.

As shown in FIG. 4, a stationary vane member 58 is arranged in a central portion of the scroll passage 47, which has a peripheral portion thereof formed with four stationary vanes 60 concentrically surrounding a turbine wheel 59. These stationary vanes are arcuate in shape and are circumferentially arranged at equal intervals with each other.

Disposed between adjacent stationary vanes 60 are movable vanes 63 with one end thereof secured to respective rotary pins 62 rotatably supported by the back plate 61. All the movable vanes 54 are pivotable simultaneously with each other to adjust the area of space (hereinafter called "space area") between adjacent stationary vanes 60.

Each movable vane 63 is also arcuate in shape, with almost the same curvature as the stationary vanes 60, and pivotable between a fully closed position shown by the solid line in FIG. 4 and a fully open position shown by the chain line in the figure.

The rotary pins 62 are operatively connected to an actuator 71 in FIG. 1 by means of a driving rod 70 appearing in FIG. 1 so that the movable vanes 63 are simultaneously controlled to open and close by the actuator 60.

When the driving rod 70 is shifted in its extending direction (leftward as viewed in FIG. 1), the opening degree of the movable vanes 63 is decreased to thereby increase the space area between adjacent movable and stationary vanes, whereas when the rod 70 is shifted in its receding direction (rightward as viewed in FIG. 1), the opening degree of the movable vanes 63 is increased to thereby decrease the space area between adjacent movable and stationary vanes. Thus, the opening degree of the movable vanes 63 is controlled to adjust the capacity of the turbocharger.

The actuator 71 has, as shown in FIG. 1, a first pressure chamber 71b and a second pressure chamber 71c separated from each other by a diaphragm 71a. The driving rod 70 penetrates a housing wall of the actuator 71 and is connected to the diaphragm 71a on the second pressure chamber 71c side. A spring 71d is mounted in the second pressure chamber 71c for biasing the diaphragm in a direction such that the driving rod 70 is receded, i.e. in a direction such that the opening degree of the movable vanes 63 is increased.

Connected to the first pressure chamber 71 are a portion of the intake passages between the air cleaner 5 and the turbocharger 4 by way of a restriction 22, and a portion of the intake passage between the intercooler 6 and the turbocharger 4 by way of a regulator 73, a restriction 74, and a control valve 75 for introducing supercharging pressure into the chamber 71.

The control valve 75 for introducing supercharging pressure is a normally-closed ON-OFF two position type electromagnetic valve which comprises a solenoid 75a, and a valve body 75b which is opened upon energization of the solenoid 75a. When the solenoid 75a is energized to open the valve body 75b, supercharging pressure P2 within the intake passage between the intercooler 6 and the turbocharger 4 is introduced into the first pressure chamber 71b of the actuator 71.

Accordingly, the magnitude of supercharging pressure is controlled by controlling the ON-OFF duty ratio $D_1$ of the solenoid 75a of the control valve 75. As the ON-OFF duty ratio $D_1$ is larger, the pressure introduced into the first pressure chamber 71b becomes higher to thereby decrease the supercharging pressure $P_2$.

In the meanwhile, connected to the second pressure chamber 71c of the actuator 71 is a portion of the intake passage downstream of the throttle valve 7 by way of a constant pressure valve 76 and a control valve 77 for introducing negative pressure into the chamber 71c. The control valve 77 for introducing negative pressure is, similarly to the control valve 75 for introducing supercharging pressure, a normallyclosed ON-OFF two position type electromagnetic valve which comprises a solenoid 77a, and a valve body 77b. When the solenoid 77a is energized to open the valve body 77b, negative pressure regulated to a constant value by the constant pressure valve 76 is introduced into the second pressure chamber 71c, whereas when the solenoid 77a is deenergized to close the valve body 77b, the atmosphere is introduced into the second pressure chamber 71c by way of the air cleaner 77c.

Accordingly, supercharging pressure P2 is also controlled by controlling the ON-OFF duty ratio $D_2$ of the solenoid 77a of the control valve 77. As the ON-OFF duty ratio $D_2$ is larger, the pressure introduced into the second pressure chamber 71c becomes lower to thereby decrease the supercharging pressure $P_2$.

The solenoids 75a, 77a of the control valves 75, 77 are connected to the ECU 9, and the duty ratios $D_1$, $D_2$ are controlled by signals therefrom.

The ECU 9, which operates when the engine 1 is in operation, determines operating conditions of the engine 1 based on input signals from various parameters, calculates a fuel injection period $T_{OUT}$ for fuel injection valves 12, timing of ignition of an ignition device 31, etc. so as to optimize operating characteristics of the engine, such as fuel consumption and accelerability, based on the determined operating conditions, and supplies driving signals based on the results of calculation of the fuel injection valves 12 and the ignition device 31.

The ECU 9 also calculates the ON-OFF duty ratio $D_1$ of the control valve 75 for introducing supercharging pressure and the ON-OFF duty ratio $D_2$ of the control valve 77 for introducing negative pressure, and supplies driving signals based on the results of the calculation to the solenoid 75a of the control valve 75 and the solenoid 77a of the control valve 77 to drive the actuator 71, whereby the turbocharger is controlled to an optimum capacity.

Further, the ECU 9 decides whether to effect operation or stoppage of the water pump 20 in response to input signals from sensors in accordance with a control program described hereinafter during operation of the engine 1, and supplies a driving signal indicative of the decision to the water pump 20.

The ECCU 15, which operates when the engine 1 is in operation or over a predetermined period of time after the engine 1 has ceased to operate, decides as to the operation or stoppage, direction of rotation, and speed of the radiator fan 27, the operation or stoppage of the bonnet fan 28, and the operation or stoppage of the water pump 20 after stoppage of the engine 1, based on input signals from the $T_{WE1}$ sensor 14, the $T_{OIL}$ sensor 16, and the $T_{WT}$ sensor 24, and supplies driving signals resulting from the above decisions to the water pump 20, and the first and second motors 29, 30.

The ECCU 15 is electrically connected to the ECU 9. When the engine 1 is in operation, the ECU 9 executes control of the operation and stoppage of the bonnet fan 28 by way of the ECCU 15, and carries out a fail-safe operation for the bonnet fan 28 when the ECCU 5 detects abnormality thereof.

The ECU 9 also carries out a fail-safe operation described hereinafter for sensors when the ECCU 15 detects abnormality in the sensors during operation of the engine 1.

Figure 5A:
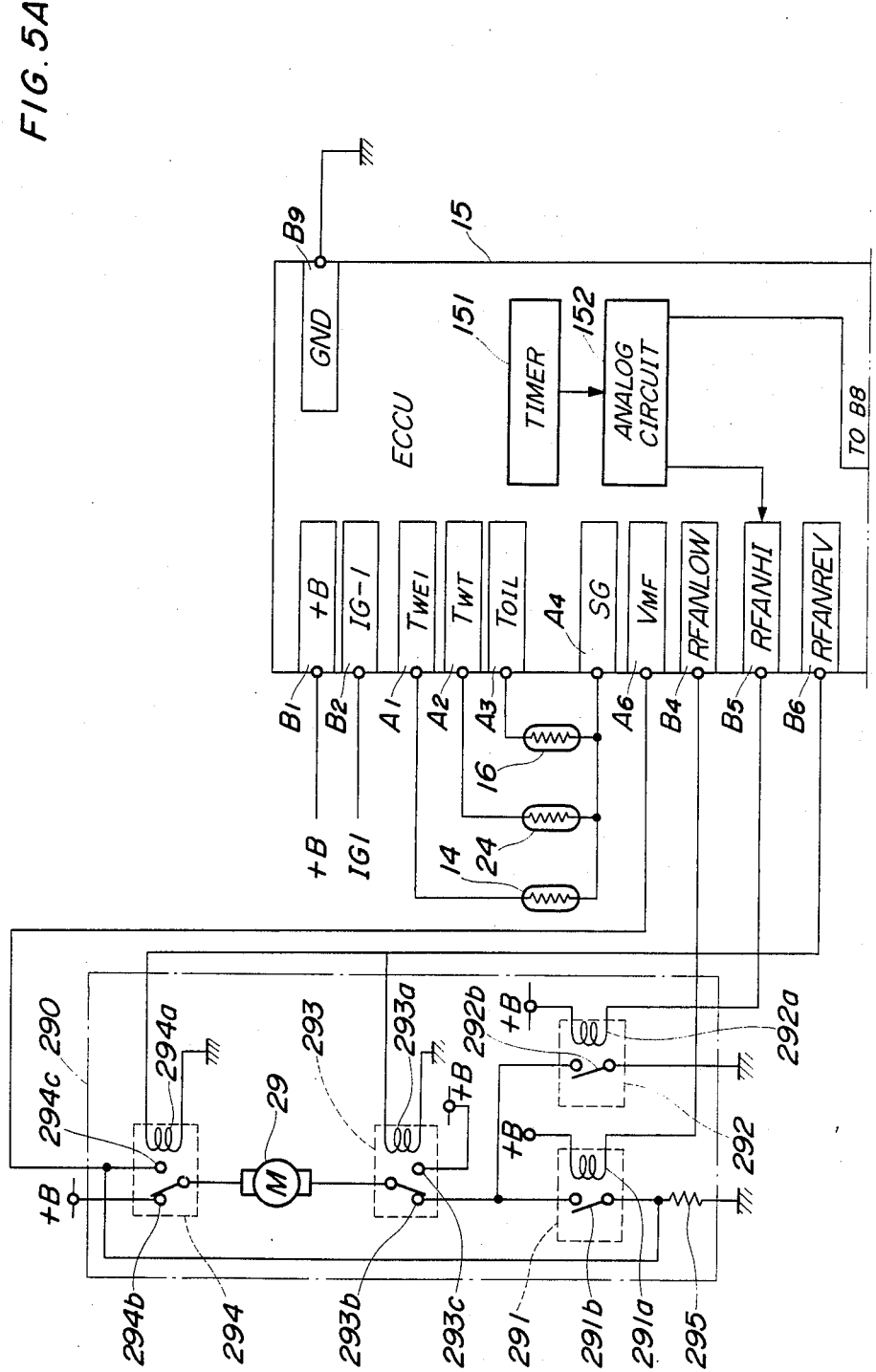

FIG. 5 is a wiring diagram showing the external connections of the ECCU 15 in detail. The ECCU 15 has terminals $B_1$ to $B_9$, and $A_1$ to $A_{12}$. The terminal $B_1$ is connected to a battery, to be supplied with an operating voltage therefrom. The terminal $B_9$ is grounded to the body of the vehicle.

The terminal $B_2$ is connected to an ordinary ON-OFF terminal of the ignition switch 25, whereas the terminal $B_3$ is connected to the battery even when the ignition switch is OFF. If the ignition switch 25 is turned off or opened when the engine is in operation, the engine 1 ceases to operate, and the ECU 5 also becomes inoperative (except for the function of its memory preserving its stored data) by the turning-off of the ignition switch 25. In contrast, the ECCU 15 can operate, if desired, over a predetermined period of time even after the engine 1 has ceased to operate, since it is provided with the terminal $B_2$ which is connected to the battery even after the ignition switch 25 is turned off. The predetermined period of time after stoppage of operation of the engine 1 is set by a timer which is started when the ignition switch 25 is turned off.

During the predetermined period of time set by the timer, at least one of the radiator fan 27, the bonnet fan 28, and the water pump 20 is electrically driven in the state where the engine is not in operation, hence in the state where charging of the battery is not carried out by a generator installed on the vehicle. Therefore, the predetermined period of time is set to such a value as to minimize the consumption of electricity charged in the battery and at the same time enhance the cooling performance while taking into consideration the size of the engine room and the layout of engine parts accommodated therein. For example, the predetermined period of time over which the ECCU is allowed to operate is set to 15 minutes.

The terminals $A_1$ to $A_3$ are for inputting into the ECCU 15 signals from the $T_{WE1}$ sensor 14, the $T_{WT}$ sensor 24, and the $T_{OIL}$ sensor 16, respectively. The terminal $A_4$ is for grounding the signal system of the internal circuit of the ECCU 15. The terminal $A_5$ is connected to an air conditioning (A/C) unit 80, and an ON-OFF signal from the switch of the air conditioning unit 80 is inputted to the ECCU 15 therethrough.

The terminals $B_4$ to $B_6$ are for controlling the radiator fan 27 and are connected to a driving circuit 290. The driving circuit 290 has first and second relay circuits 291, 292 for selecting low-speed forward rotation and high-speed forward rotating of the radiator fan 27, which respectively comprise coils $291a$, $292a$ and normally-open contacts $291b$, $292b$, third and fourth relay circuits 293, 294 for selecting forward rotation and reverse rotation of the radiator fan 27, which respectively comprise coils $293a$, $294a$, normally-closed terminals $293b$, $294b$, and normally open terminals $293c$, $294c$, and a resistance 295. The terminal $B_4$ for passing instructions for low speed rotation of the radiator fan 2? is connected to the first relay circuit 291, the terminal $B_5$ for passing instructions for high speed rotation of the radiator fan 27 is connected to the second relay circuit 292, the terminal $B_6$ for passing instructions for reverse rotation is connected to the third and fourth relay circuits 293, 294.

High speed, low speed, forward, and reverse rotations of the radiator fan 27 are carried out in the following manner.

To select low-speed forward rotation of the radiator fan 27, a low-level signal is supplied through the terminal $B_4$ to the first relay circuit 291 to cause same to operate, whereby driving current which is decreased by the resistance 295 flows to the first motor 29 to thereby cause low-speed rotation of the radiator fan 27. To select high-speed forward rotation of the radiator fan 27, a low-level signal is supplied through the terminal $B_5$ to the second relay circuit 292, whereby large driving current flows to the motor 29 to, thereby cause high speed rotation of he radiator fan 27.

To select reverse rotation of the radiator fan 27, a high-level signal is supplied through the terminal $B_6$ to the third and fourth relay circuits 93. 294 to cause the respective relay contacts to be connected to the normally open terminals $293c$, $294c$, whereby the polarity of voltage applied to the motor 29 is inverted and at the same time driving current is decreased by the resistance 295 to thereby cause low-speed reverse rotation of the radiator fan 27.

The reverse rotation of the radiator fan 27 is carried out continuously or intermittently over the predetermined period of time after stoppage of the engine 1. In this state, as shown by the arrows in FIG. 2, air in the engine room 26 is discharged therefrom to the outside in front of the vehicle.

The terminal $B_7$ is for controlling the bonnet fan 28, and is connected to a relay circuit 301 which is part of a driving circuit 300 and comprises a coil $301a$, and normally-open contacts $301b$. A fuse 310 for exclusive use is also provided in the driving circuit 300. The operation of the bonnet fan 28 is different from that of the radiator fan 27 in that it is merely driven or stopped by the second motor 30. The bonnet fan 28 is operated when a high-level signal is supplied to the terminal $B_7$, and stopped when a low-level signal is supplied thereto.

The operation of the bonnet fan 28 is continuously or intermittently carried out over the predetermined period of time after the stoppage of the engine 1.

The terminal $B_8$ is for controlling the water pump 20, and is connected to a driving circuit 200 having a third motor 201 for driving the water pump 20, and a relay circuit 202 comprising a coil $202a$ and normally-open contacts $202b$. The driving circuit 200 also has a fuse 210 for exclusive use. Similarly to the operation of the bonnet fan 28, the water pump 20 is also merely driven or stopped by the third motor 201. The water pump is operated when a high-level signal is supplied to the terminal $B_8$ and stopped when a low-level signal is supplied thereto.

The operation of the water pump 20 is carried out continuously, or intermittently in place of the bonnet fan 28, during operation of the engine 1 or over the predetermined period of time after stoppage of the engine 1.

The terminals $A_6$ to $A_8$ serve as ports for monitoring terminal voltages $V_{MF}$, $V_{BF}$, and $V_{WP}$ of the respective first to third motors 29, 30, 201 for the radiator fan 27, the bonnet fan 28, and the water pump 20. The terminals $A_9$ to $A_{12}$ are connected to the ECU 9. The terminal $A_9$ is for inputting a signal supplied from the ECU 9 for controlling the water pump 20. The control signal is obtained based on operating conditions of the engine 1 determined by the engine rotational speed, the engine coolant temperature, the intake air temperature, etc.

The terminal $A_{10}$ serves as a fail-safe output terminal, through which a control signal is supplied to the ECU 9, for giving instructions for fail-safe operation when abnormality is detected. The ECU 9 carries out fail-safe operation described hereinafter in response to the control signal.

The terminal $A_{11}$ is connected to an air-conditioning refrigerant pressure switch 81 and supplied with a signal indicative of ON- or OFF-state of the switch 81. The switch 81 is turned on when the refrigerant pressure of a compressor, not shown, of the air-conditioning unit is equal to or higher than a predetermined value. The ON-OFF signal is also supplied to the ECU 9. The terminal $A_{12}$ outputs to the ECU 9 a signal indicating that the air-conditioning unit is in operation.

The aforesaid switch 81 and terminal $A_{11}$ are used for controlling the operation of the radiator fan in the following manner.

If the engine coolant temperature $T_{WE1}$ exceeds a predetermined high temperature value (e.g. 90° C.), it is necessary to supply a low-level voltage signal to the terminal $B_5$ so as to cause high-speed forward rotation of the radiator fan to thereby air-cool the engine 1. However, even if the engine coolant temperature $T_{WE1}$ is slightly lower than the predetermined high temperature (e.g. higher than 84° C.), depending on the operation of the air conditioning unit and the pressure of the refrigerant, it may be sometimes desirable to cause rotation of the radiator fan 27, and to switch between high speed rotation and low speed rotation thereof. Particularly, if the radiator fan 27 and the condenser fan of the air conditioning unit are interconnected to operate together, degradation of the performance of the air conditioning unit can be prevented by cooling the refrigerant through rotating the radiator fan 27 even before the engine coolant temperature $T_{WE1}$ exceeds the predetermined high temperature. Further, in this case, if the intensity of blowing, i.e. the speed of rotation of the radiator fan 27, is increased or decreased depending on whether or not the pressure of the refrigerant is higher than a predetermined value (e.g. 10 kg/cm$^2$), it is possible to control air conditioning more properly.

Therefore, when the engine coolant temperature $T_{WE1}$ does not exceed the predetermined high temperature value, the radiator fan 27 is controlled in the following manner. If the pressure of refrigerant of the air conditioning unit is high, i.e. if the aforesaid switch 81 is ON, the radiator fan 27 is controlled in advance to high speed rotation, whereas if not, i.e. if the switch 81 is OFF, the radiator fan 27 is controlled to low speed rotation.

The air-conditioning refrigerant pressure switch 81 and the terminal $A_{11}$ are provided for collecting information necessary for the above-described control of the radiator fan 27. The program for this control may be stored in advance in the memory means of the ECCU 15.

The ECCU 15 comprises an input circuit which is supplied with various input signals, carries out waveform-shaping of some of the input signals, shifts the voltage level of input signals to a predetermined level, converts analog signals of the input signals to digital signals, etc., a central processing unit (CPU), memory means storing programs to be executed in the CPU and for storing the calculation results outputted from the CPU, and an output circuit for outputting signals to the terminals $B_4$ to $B_8$, $A_{10}$, and $A_{12}$. Further, if the water pump 20 is intermittently operated as described hereinbefore, the ECCU 15 may also include a timer for controlling the operation of the water pump 20.

Further, the ECCU 15 includes a timer 151 for counting a processing time period of the CPU in order to determine whether or not the CPU is normally functioning, and an analog circuit 152 which is responsive to a predetermined signal generated when the timer 151 has counted up, to apply voltages at predetermined levels to the terminals $B_5$ and $B_8$.

Next, the operation of the cooling control system thus constructed will be described below.

Figure 6A:
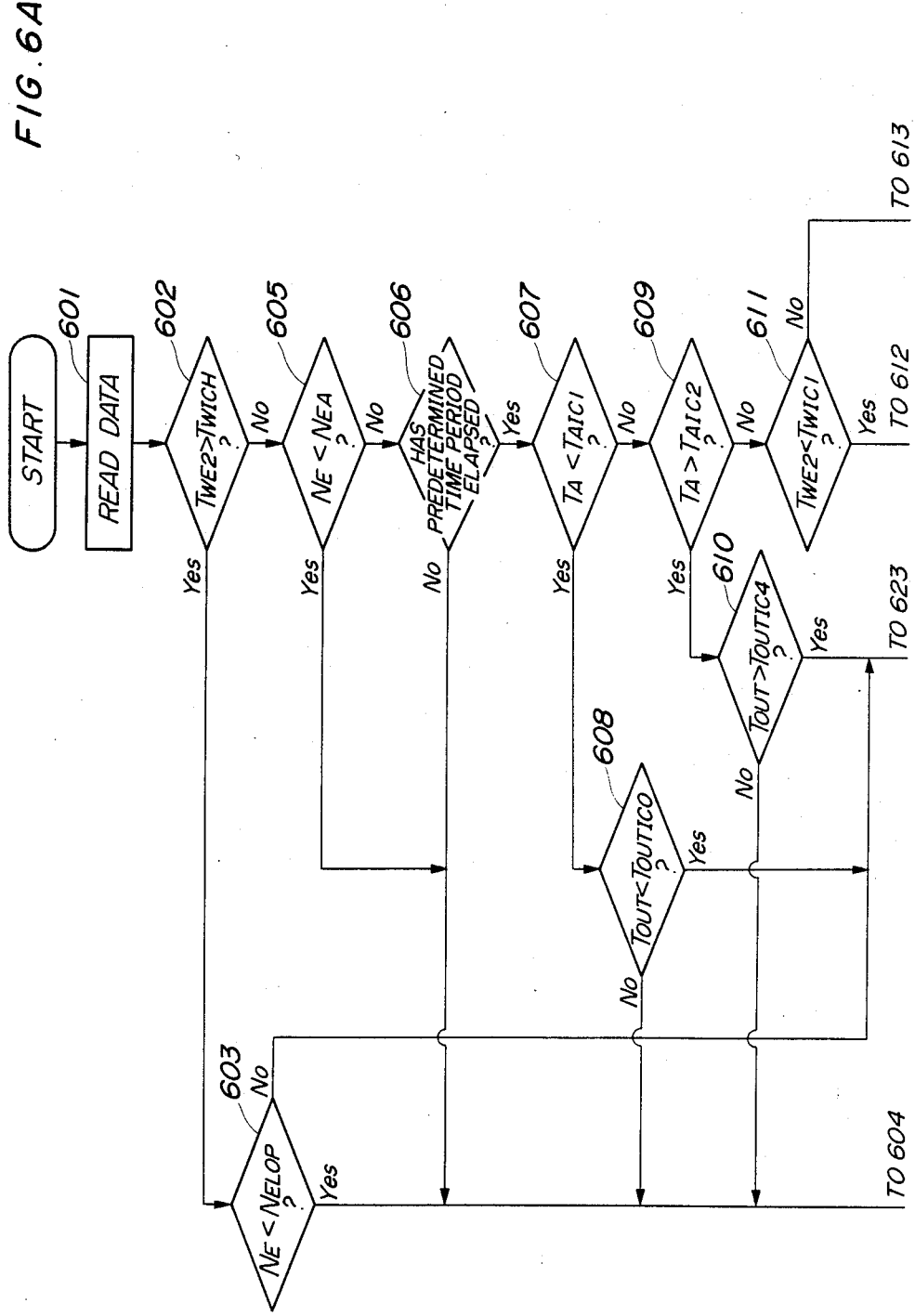

FIG. 6 shows a subroutine for controlling the operation and stoppage of the water pump 20. This program is executed by the ECU 9 when the ignition switch 25 is ON, that is, when the engine 1 is in operation, either in synchronism with generation of the TDC signal pulses or in asynchronism therewith, i.e. at predetermined constant intervals of time.

First, at a step 601, reading is effected of respective output values of engine coolant temperature $T_{WE2}$, intake air temperature $T_A$, and engine rotational speed $N_E$ from the engine coolant temperature sensor, intake air temperature sensor, and engine rotational speed sensor, as well as data on the fuel injection period TOUT calculated as above for the fuel injection valves 12. Then, it is determined at a step 602 whether or not the engine coolant temperature $T_{WE2}$ is higher than a predetermined value $T_{WICH}$ (e.g. 100° C.) above which the engine 1 should be deemed to be in a very high temperature condition. If the answer is Yes, it is determined at a step 603 whether or not the engine rotational speed $N_E$ is lower than a predetermined value $N_{ELOP}$ which corresponds to the idling speed of the engine. If the answer is yes, the water pump 20 is stopped at a step 604, followed by terminating the program, whereas if the answer is no, the program proceeds to a step 623, hereinafter referred to.

If the answer to the question of the step 602 is no, i.e. if $T_{WE2} \leq T_{WICH}$, it is determined at a step 605 whether or not the engine rotational speed $N_E$ is lower than a predetermined value $N_{EA}$ (e.g. 400 rpm) which corresponds to a value assumed at the completion of cranking of the engine. If the answer is yes, it is decided that the engine is still being cranked, and then the above step 604 is executed, and then the program is ended.

If the answer at the step 605 is no, i.e. if $N_E \geq N_{EA}$, it is determined whether or not a predetermined period of time has elapsed after the condition of $N_E \geq N_{EA}$ has been satisfied, at a step 606. If the predetermined time period has not elapsed, the above step 604 is executed, while if it has elapsed, the program proceeds to a step 607.

At the step 607, it is determined whether or not the intake air temperature $T_A$ is lower than a first predetermined value $T_{AIC1}$ (e.g. 15° C.). If the answer is yes, it is determined whether or not the fuel injection period $T_{OUT}$ calculated is longer than a first predetermined value $T_{OUTICO}$ at a step 608. This step is for determining whether or not the engine 1 is operating in a predetermined high load condition. If the answer at the step 608 is no, that is, if $T_{OUT} \leq T_{OUTICO}$ the above step 604 is executed, while if the answer is yes, the program proceeds to the step 623. In this way, when the engine 1 is in a high load condition at a low intake air temperature, the water pump 20 is operated.

If the answer to the question of the step 607 is no, that is, if $TA \geq TAIC1$, it is determined at a step 609 whether or not the intake air temperature $T_A$ is higher than a second predetermined value (e.g. 90° C.). If the answer is yes, it is determined whether or not the calculated fuel injection period $T_{OUT}$ is longer than a second predetermined value $T_{OUTIC4'}$ at a step 610. This step is for determining whether or not the engine 1 is in a predetermined middle or high load condition. If the answer at the step 610 is no, that is, if $T_{OUT} \leq T_{OUTIC4'}$ the step 604 is executed, while if the answer is yes, the program proceeds to the step 623. In this way, when the engine 1 is operating in a middle or high load condition, the water pump 20 is operated.

If the answer to the question of the step 609 is no, that is, if $T_{AIC1} \leq T_A \leq T_{AIC2'}$ it is determined whether or not the engine coolant temperature $T_W$ is lower than a first predetermined value $T_{WIC1}$ (e.g. 20° C.), at a step 611. If the answer is yes, that is, if $T_{WE2} < T_{WIC1'}$ an address i corresponding to the detected engine coolant temperature $T_{WE2}$ is set to 1, at a step 612. This address i cooperates with an address j corresponding to the detected engine rotational speed $N_E$ to indicate an address location in a map shown in FIG. 7, in which third injection period values $T_{OUTICij}$ are stored as the fuel injection period $T_{OUT}$ to be set.

If the answer to the question of the step 611 is no, it is determined whether or not the engine coolant temperature $T_{WE2}$ is lower than a second predetermined value $T_{WIC2}$ which is higher than the first predetermined value $T_{WIC1'}$ at a step 613. If $T_{WIC1'} \leq T_{WE2} \leq T_{WIC2'}$, the address i is set to 2, at a step 614, while if $T_{WE2} \geq T_{WIC2'}$ the address i is set to 3, at a step 615.

After thus setting of the address i in response to the engine coolant temperature $T_{WE2}$ at the step 612, 614 or 615, setting of the address j is executed at steps 616 to 620, in a manner similar to the setting of the address i described above. Specifically, at the step 616, it is determined whether or not the engine rotational speed $N_E$ is lower than a first predetermined value $N_{EIC1}$ (e.g. 3,500 rpm), and at the step 618 whether or not it is lower than a second predetermined value $N_{EIC2}$ (e.g. 6,000 rpm) higher than $N_{EIC1'}$ respectively. If $N_E < N_{EIC1'}$ $N_{EIC1'} \leq N_E < N_{EIC2'}$ and if $N_E \geq N_{EIC2'}$ the address j is set to 1, 2, and 3, respectively, at the respective steps 617, 619, and 620.

Next, a third predetermined fuel injection period value $T_{OUTICij}$ of $T_{OUT}$ is read from the map of FIG. 7, which corresponds to the combination of values of the addresses i, j set as above, at a step 621. This third predetermined fuel injection period is set to shorter values as the set value of the address i is larger, that is, as the engine coolant temperature $T_{WE2}$ is higher.

Then, it is determined at a step 622 whether or not the calculated fuel injection period $T_{OUT}$ is longer than than the read third value $T_{OUTICij}$. If $T_{OUT} \leq T_{OUTICij'}$ the above step 604 is executed, whereas if $T_{OUT} > T_{OUTICij'}$ the program proceeds to the step 623. The step 623 determine whether or not the battery output voltage $V_B$ is higher than a predetermined value $V_{BIC}$. If the answer is no, the above step 604 is executed, while if the answer is yes, the water pump 20 is operated at a step 624, followed by terminating the program.

By virtue of the above control, the operation and stoppage of the water pump 20 are controlled so that the intake air temperature $T_A$ becomes a suitable value at which overcooling and overheating of the intake air does not take place Next, reference is made to a method of detecting abnormality in sensors and ECCU 15, as well as failsafe operations to be effected in the event of abnormality occurring in the sensors, etc.

First, the ECCU 15 determines whether or not the respective output values from the sensors, i.e. engine coolant temperature $T_{WE1}$, turbocharger coolant temperature $T_{WT}$, and lubricating oil temperature $T_{OIL}$ are within respective predetermined ranges within which outputs from the respective sensors can fall when they are normally functioning. If any of these parameter values is found to be out of the predetermined or normal range, the ECCU 15 decides that the corresponding sensor is abnormal, and then sets the detected output value from the sensor to a predetermined fixed value as a substitutive value $T_{WEIFS'}$ $T_{WTFS'}$ or $T_{OILFS}$. These substitutive values are set at higher values than normal values so that the water pump 20, the radiator fan 27, and the bonnet fan 28 may positively operate. As a result, in the event of failure of any of the sensors, operation of the above components of the cooling device can be ensured, to thereby prevent overheating of the engine system. During operation of the engine 1 in particular, if the radiator fan 27 is stopped, there is a fear that the engine temperature abnormally rises, but the above described control according to the invention will positively prevent such abnormal situations.

The ECCU 15 lights an LED (light emission diode) a number of times corresponding to the sensor which is decided to be abnormal, and at the same time supplies a fail-safe signal to the ECU 9 through the terminal $A_{10}$.

The ECU 9 operates in response to the fail-safe signal to increase both or either one of the duty ratio $D_2$ for the control valve 75 for introduction of supercharging pressure and the duty ratio $D_1$ for the control valve 77 for introduction of negative pressure, to thereby drive the actuator 71 to reduce the supercharging pressure P2. Thus, the engine output is lowered, whereby overheating of the turbocharger 4 and hence overheating of the engine 1 can be prevented.

This engine output lowering control may be applied when abnormality occurs in any other parts of the cooling control system including input circuits of sensors.

Further, in the above case, the ECU 9 resets to a smaller value at least one of the predetermined value $T_{WICH}$ of engine coolant temperature $T_{WE2'}$ applied at the step 601, and the first and second predetermined values $T_{WIC1}$ and $T_{WIC2}$ of engine coolant temperature $T_{WE2'}$ which are applied respectively at the steps 611 and 613. As will be clear from the control program of FIG. 6 and the map of FIG. 7, as each of these predetermined coolant temperature values is set to a smaller value, the operating range of the water pump 20 is expanded. Therefore, by the above resetting, excessive rises in the temperatures of the turbocharger 4 and the engine I can be prevented. Further, the ECU 9, which is originally provided to effect control of fuel injection, etc., also controls the cooling of the engine 1 and the turbocharger 4, which makes it possible to dispense with the need of a special control device for coping with abnormality in the sensor system.

Furthermore, the ECU 9 operates to light an LED provided on the side of the ECU 9 and a warning lamp provided on the instrument panel within the vehicle compartment, thus giving a warning to the driver.

On the other hand, the abnormality in the functioning of the ECCU 15 per se, that is, the failure of the CPU within the ECCU 15 is detected by the aforementioned timer 151. More specifically, the timer counts a predetermined period of time which is longer than a given processing period of time within which the CPU is to complete a predetermined processing, that is, it detects an abnormality if the predetermined period of time counted from the time the CPU started the predetermined processing has elapsed before it completes same. When the timer 151 has counted up, it is decided that there is an abnormality in the CPU per se, and then a predetermined signal is generated to turn the LED on.

The predetermined signal generated as above is supplied to the aforementioned analog circuit 152 connected to the terminals $B_5$ and $B_8'$ which circuit in turn generates a low level output and supplies it to the terminal $B_5$ so that the radiator fan 27 is driven thereby to rotate at a high speed, and also generates a high level output and supplies it to the terminal $B_8$ so that the water pump 20 is driven thereby.

In the above described manner, the provision of the analog circuit 152 which can be simple in structure ensures high speed operation of the radiator fan 27 as well as operation of the water pump 20, in the event of failure in the CPU of the ECCU 15, thereby preventing excessive rises in the temperatures of the turbocharger 4 and the engine 1.

According to the above described control applied in the event of abnormality, it is possible to prevent overheating of the engine and the turbocharger and at the same time ensure proper operation of the engine system as well as a long life of same in the event of failure in the sensor system and the control system, without inviting an increase in the cost and designing the systems large in size.

Figure 8:
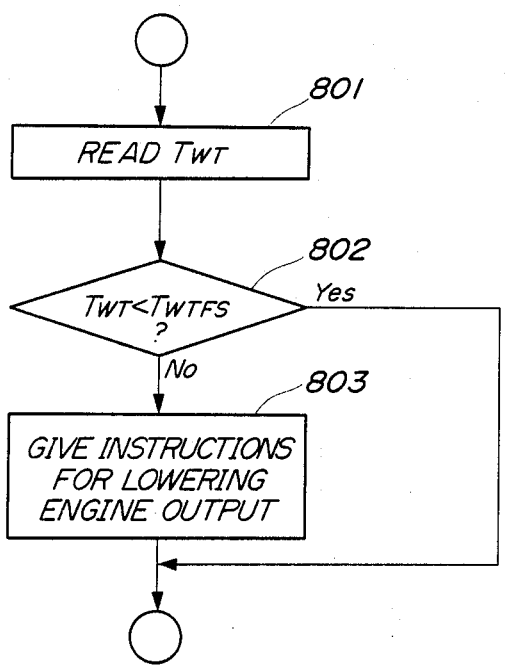
FIG. 8 is a flowchart showing a subroutine for detecting abnormality, which is an example of failsafe operation procedure.
Figure 9:
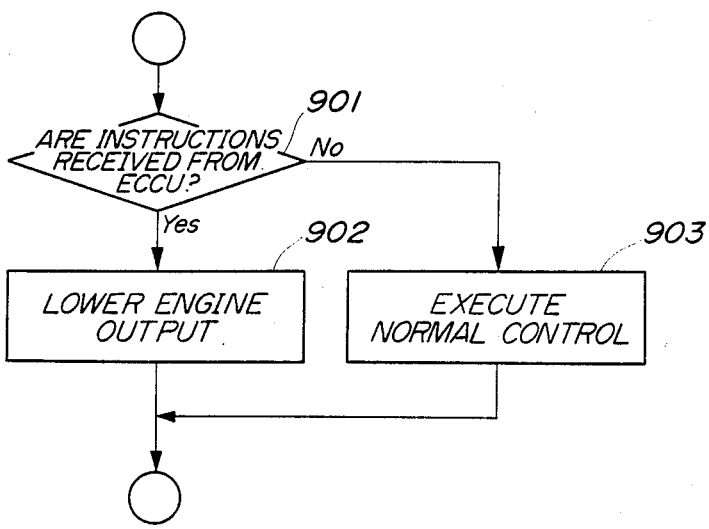
FIG. 9 is a flowchart showing a subroutine for for controlling the engine output.

FIGS. 8 and 9 show an example of the manner of executing fail-safe operation.

FIG. 8 shows a subroutine for detecting abnormality for fail-safe purposes which forms part of the program of the engine output control. The subroutine is carried out by the CPU of the ECCU 15 during operation of the engine 1 in synchronism with generation of TDC signal pulses, or in asynchronism with generation of same, i.e. at predetermined constant time intervals.

First, at a step 801, whenever the present program is executed, the turbocharger coolant temperature $T_{WT}$ is read, which is detected and supplied by the $T_{WT}$ sensor 24, i.e. the temperature of coolant at a location downstream of the turbochager 4 (the temperature of coolant after having cooled the turbocharger 4) in the cooling system 23 for the turbocharger 4 which is provided independently of the cooling system for the engine.

The temperature of coolant at a location downstream of the turbocharger 4 in the cooling system 23 accurately reflects the temperature of the turbocharger. Therefore, the temperature of coolant at a location downstream of the turbocharger 4 is suitable for use, in controlling the turbocharger temperature within a predetermined suitable range while inhibiting the temperature rise of the turbocharger 4 which is caused to rotate at high speed by exhaust gases from the engine 1 since it is not affected by the configuration of the turbocharger and can accurately represent internal and external factors.

At the step 801, the $T_{WT}$ is thus read, and in the present output control program, the read value is used for determining whether or not the turbocharger 4 is at an abnormally high temperature, and then the engine output control is carried out in accordance with the determination. Specifically, at a step 802, it is determined whether or not the read $T_{WT}$ is lower than the predetermined value $T_{WTFS}$. The predetermined value $T_{WTFS}$ is set at a value slightly lower than a value at which degradation of lubricity of the lubricating oil due to carbonization of the lubricating oil, seizure of the seal ring 64 (FIG. 3) of the turbine shaft, etc. are liable to occur in the turbocharger 4. For example, if the above inconveniences such as seizure are liable to occur when the turbocharger temperature has risen to approximately 220° to 230° C., the $T_{WTFS}$ is set to a value, e.g. 200° C., which is lower than the temperature 220° to 230° C. by a certain extent and at which the above inconveniences such as seizure can be avoided.

If the answer at the step 802 is Yes, i.e. if $T_{WT} < T_{WTFS}$ it is judged that the temperature value outputted from the $T_{WT}$ sensor 24 is not abnormal and the turbocharger is not under a condition under which the above inconveniences such as seizure may occur, and the program is directly terminated.

If the answer at the step 802 is No, i.e. if $T_{WT} \geq T_{WTFS}$ it is judged that abnormality exists in the turbocharger, and the ECCU 15 gives instructions for lowering the engine output through the terminal $A_{10}$ of the ECCU 15 to the ECU 9 for fail-safe purposes (step 803), followed by terminating the present program.

FIG. 9 shows a control subroutine which forms another part of the engine output control program. The subroutine is carried out by the CPU of the ECU 9 in synchronism with generation of TDC signal pulses.

The ECU 9 monitors the output through the terminal $A_{10}$ during operation of the engine, and whenever the present program is executed, it is determined at a step 901 whether or not the aforesaid instructions for lowering the engine output have been given by the ECCU 15. If the answer at the step 901 is Yes, the output of the engine 1 is lowered (step 902), followed by terminating the present program. Thus, the engine output can be lowered when the turbocharger temperature exceeds the predetermined value (200° C.), which is lower than the critical temperature by a certain extent, whereby the above inconveniences such as seizure can be prevented from occurring in the turbocharger 4. As described above, during operation of the engine 1, the ECU 9 carries out control for driving the water pump 20 based on the engine rotational speed $N_E$, the engine coolant temperature $T_{WE2}$, the intake air temperature $T_A$ at a location downstream of the intercooler, etc. During the control, even if the water pump 20 or the driving circuit 200 therefor goes out of order, for example, under a high load operating condition of the engine 1, whereby the circulation of coolant in the cooling system 23 is stopped, it is possible to cause the ECU 9 to carry out fail-safe operation to lower the engine output. Thus, it is possible to prevent the malfunction of the the water pump 20 etc. from bringing about seizure of the bearing parts of the main shaft of the turbocharger, particularly seizure of the seal ring thereof, which is very liable to occur, carbonization of lubricating oil, and even cracking of the main body of the turbocharger.

The control of lowering the output of the engine at the step 902 may be effected by decreasing the supercharging pressure, or by effecting fuel cut through control of the fuel injection valves 12 to which driving signals are supplied from the ECU9, or by retarding the timing of ignition through control of the ignition device 31.

If the answer at the step 902 is No, normal control is carried out at a step 903, followed by terminating the present program.

The above-described engine output lowering control may be applied when abnormality occurs in the radiator fan 27 or the bonnet fan 28, and a fail-safe signal may be generated on such an occasion.

Figure 10:
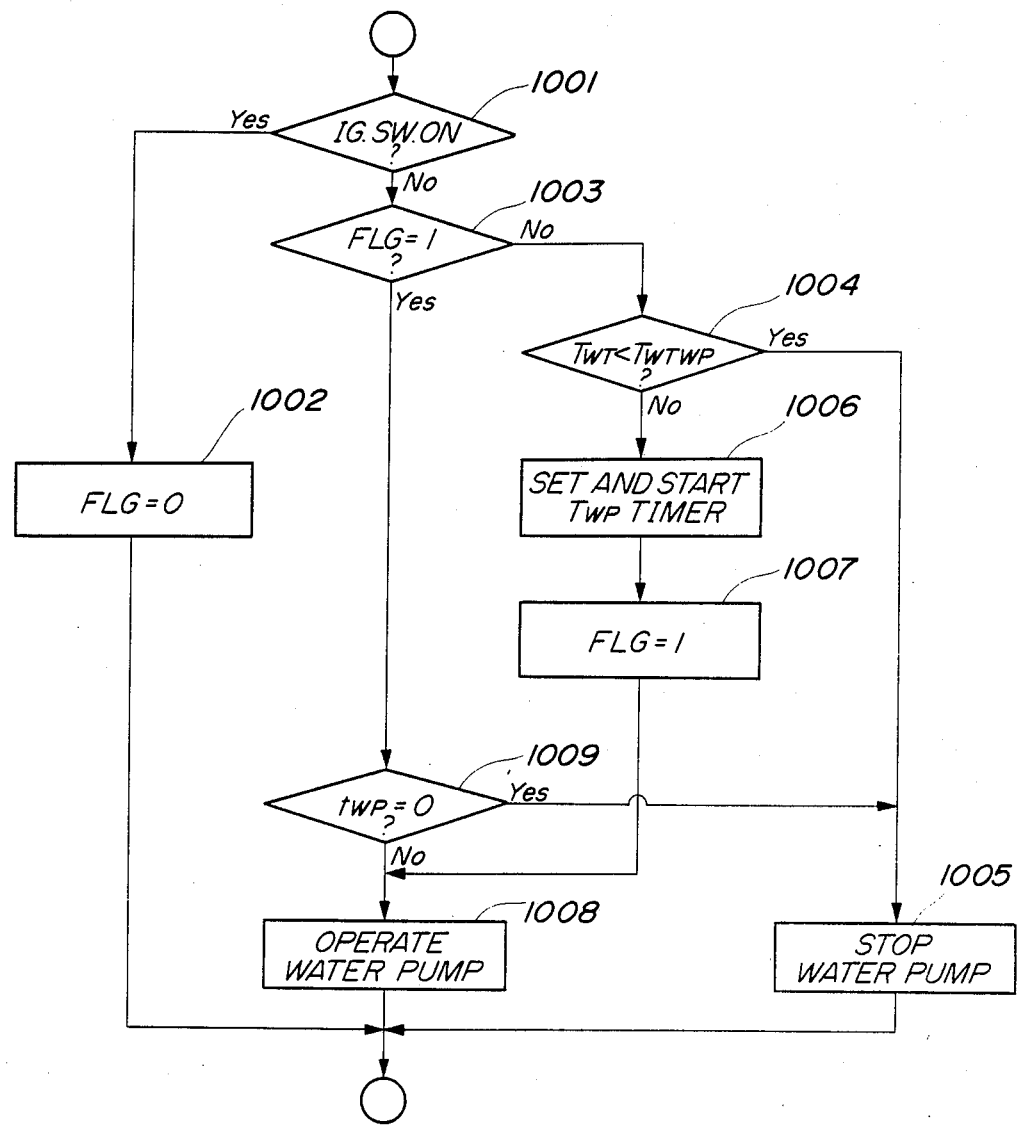
FIG. 10 is a flowchart showing a subroutine for controlling the operation of the water pump after stoppage of the engine.

FIG. 10 shows a subroutine which is executed by the ECCU 15 for controlling the operation and stoppage of the water pump 20. This program is executed at predetermined constant time intervals.

First, at a step 1001, it is determined whether or not the ignition switch 25 is ON. If the answer at the step 1001 is Yes, i.e. if the engine is in operation, a flag FLG is set to a value of 0 (step 1002), followed by terminating the present program.

If the answer at the step 1001 is No, i.e. if the engine 1 is not in operation, it is determined at a step 1003 whether or not the flag FLG has been set to a value of 1. If the answer at the step 1003 is No, i.e if the flag FLG has been set to 0, and therefore the present loop is the first loop after the engine 1 has been stopped, it is determined at a step 1004 whether or not the turbocharger coolant temperature $T_{WT}$ is lower than a predetermined value $T_{WTWP}$ (e.g. 95° C.). If the answer at the step 1004 is Yes, i.e. if $T_{WT} < T_{WTWP}$ the water pump driving circuit 200 is made inoperative and the water pump 20 is controlled to stoppage (step 1005), followed by terminating the present program.

As described above, the mere satisfaction of the condition of stoppage of the engine is not enough to start driving of the water pump 20. Operation of the water pump 20 is started with the start of a timer described below only when the $T_{WT}$ sensor 24 has detected a value higher than the predetermined value $T_{WTWP}$ after turning-off of the ignition switch 25, i.e. stoppage of the engine.

More specifically, if the answer at the step 1004 is No, i.e. if $T_{WT} \geq T_{WTWP}$ (if the AND condition of engine stoppage and $T_{WT} \geq T_{WTWP}$ is satisfied), a $t_{WP}$ timer (e.g. a down counter), not shown, for counting a predetermined time period $t_{WP}$ (e.g. 6 minutes) stored in the ECCU 15 is started (step 1006). Then, the flag FLG is set to 1 at a step 1007, and the water pump 20 is controlled to operation at a step 1008, followed by terminating the present program.

Thus, if the stoppage of the engine 1 is detected, and the detected turbocharger coolant temperature $T_{WT}$ is equal to or higher than the predetermined value $T_{WTWP}$ the $t_{WP}$ timer starts to thereby start driving the water pump 20. Once the water pump 20 is started, the operation thereof continues until the predetermined time period $t_{WP}$ elapses.

In other words, in the following loops, the answer at the step 1003 is Yes, and the program proceeds to a step 1009, where it is determined whether or not the predetermined time period $t_{WP}$ has elapsed. If the answer at the step 1009 is No, the step 1008 is executed to maintain operation of the water pump 20, whereas if the answer at the step 1009 is Yes, the step 1005 is executed to control the water pump 20 to stoppage, followed by terminating the present program.

According to the above-described cooling control, when the turbocharger 4 which continues to rotate by inertia after stoppage of the engine 1 is cooled by the water pump 20 in order to prevent occurrence of thermal damage such as seizure of the bearing parts due to high temperature of the turbocharger driving of which has been stopped, it is possible to drive the water pump 20 in accordance with operating conditions of the engine immediately before stoppage thereof only over the predetermined time period $t_{WP}$ when cooling of the turbocharger is required. Thus, the water pump 20 is hardly driven when cooling of the turbocharger is not required, which makes it possible to carry out cooling control to just a sufficient extent. Further, it is possible to prevent wasteful consumption of the battery, and degradation of the durability of the motor 201 for driving the water pump 20.

Although the program of FIG. 10 is arranged such that the water pump 20 is stopped after the predetermined time period $t_{WP}$ has elapsed, it may alternatively be arranged such that a step of setting the flag FLG to a value of 0 is added between the steps 1009 and 1005 so that the water pump 20 can be intermittently driven within a time period over which the ECCU 15 is operative on condition that $T_{WT} \geq T_{WTWP}$ is satisfied again.

Further, in the above embodiment of the invention, the turbocharger coolant temperature $T_{WT}$ is adopted as a parameter for setting the time period $t_{WP}$ for operating the water pump 20. However, equivalent effects can be obtained by detecting the engine coolant temperature $T_{WE1}$.

Figure 11:
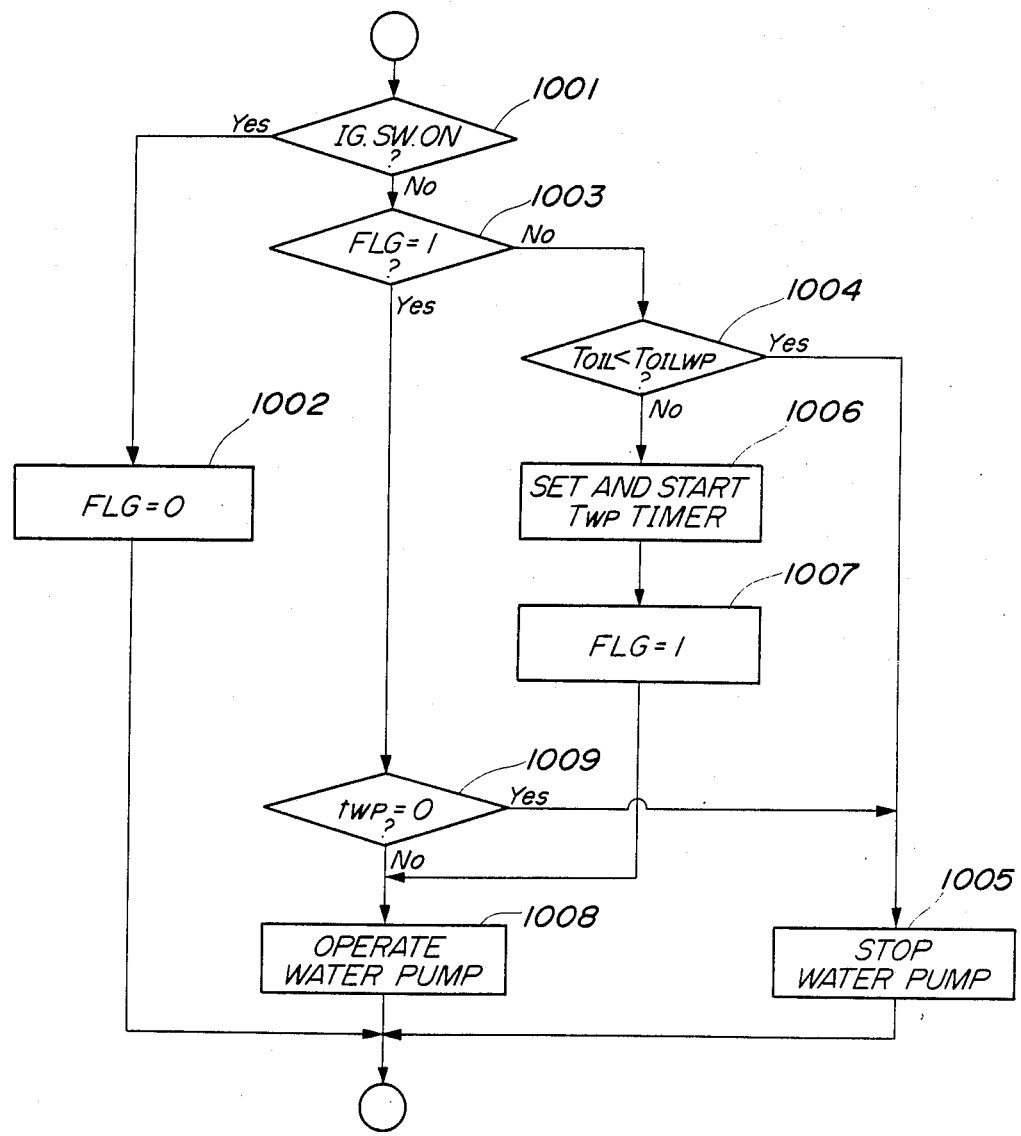
FIG. 11 is a flowchart showing a variation of FIG. 10.

FIG. 11 shows a variation of the program shown in FIG. 10. In this variation, the engine lubricating oil temperature $T_{OIL}$ is used as the parameter for setting the time period $t_{WP}$ for operating the water pump 20. In FIG. 11, like step numbers designate steps corresponding to those of FIG. 10, respectively.

In FIG. 11, if the answer at the step 1003 is No, it is determined at the step 1004 whether or not the engine lubricating oil temperature $T_{OIL}$ is lower than a predetermined value $T_{OILWP}$ (e.g. 105° C.) for determining whether or not the water pump 20 should be operated. In this embodiment, as shown in FIG. 1, the $T_{OIL}$ sensor 16 detects the temperature $T_{OIL}$ of engine lubricating oil in the head cover of the engine 1.

The lubricating oil temperature $T_{OIL}$ is used as a parameter for controlling the operation of the water pump 20 after stoppage of the engine for the following reason:

The lubricating oil temperature is one of the temperatures representative of the temperature of the main body of the engine. Since the lubricating oil is less susceptible to external factors, such as air stream produced by running of the vehicle and the driving method of the radiator fan 27, than engine cooling water (engine coolant), it can represent the load on the engine 1 more accurately.

On the other hand, engine cooling water is cooled to a larger degree as air stream produced by running of the vehicle is hit against the engine at a higher rate. Therefore, there can be the phenomenon that the cooling water temperature is lowered whereas load on the engine is increased. In contrast, the lubricating oil temperature hardly depends on such external factors. For example, when the vehicle is cruising at a speed of 60 km/h, the lubricating oil temperature is stable approximately within the range of 100+5° C., and when the vehicle is cruising at a speed of 100 km/h, the lubricating oil temperature is approximately within the range of 115+5° C.

Therefore, in the cooling control after stoppage of the engine, the lubricating oil temperature $T_{OIL}$ is used which is less susceptible to the external factors, and hence is capable of preventing inconvenience due to the external factors (for example, if the cooling water temperature is used, when the engine has been operating under a heavily-loaded condition, and therefore cooling should be carried out, the water temperature can be low, though in rare cases, and adversely affect the cooling control). Thus, the lubricating oil temperature more accurately represents the engine load condition before stoppage of the engine.

Accordingly, if the lubricating oil temperature $T_{OIL}$ is used, more accurate cooling control can be effected while excluding the external factors before stoppage of the engine.

In addition, in this embodiment, the lubricating oil temperature $T_{OIL}$ is detected in the vicinity of the engine 1. However, since the lubricating oil is commonly used for the engine 1 and the turbocharger 4, the same effects as described above can be obtained even if the lubricating oil temperature $T_{OIL}$ is detected in the vicinity of the turbocharger 4.

Figure 12:
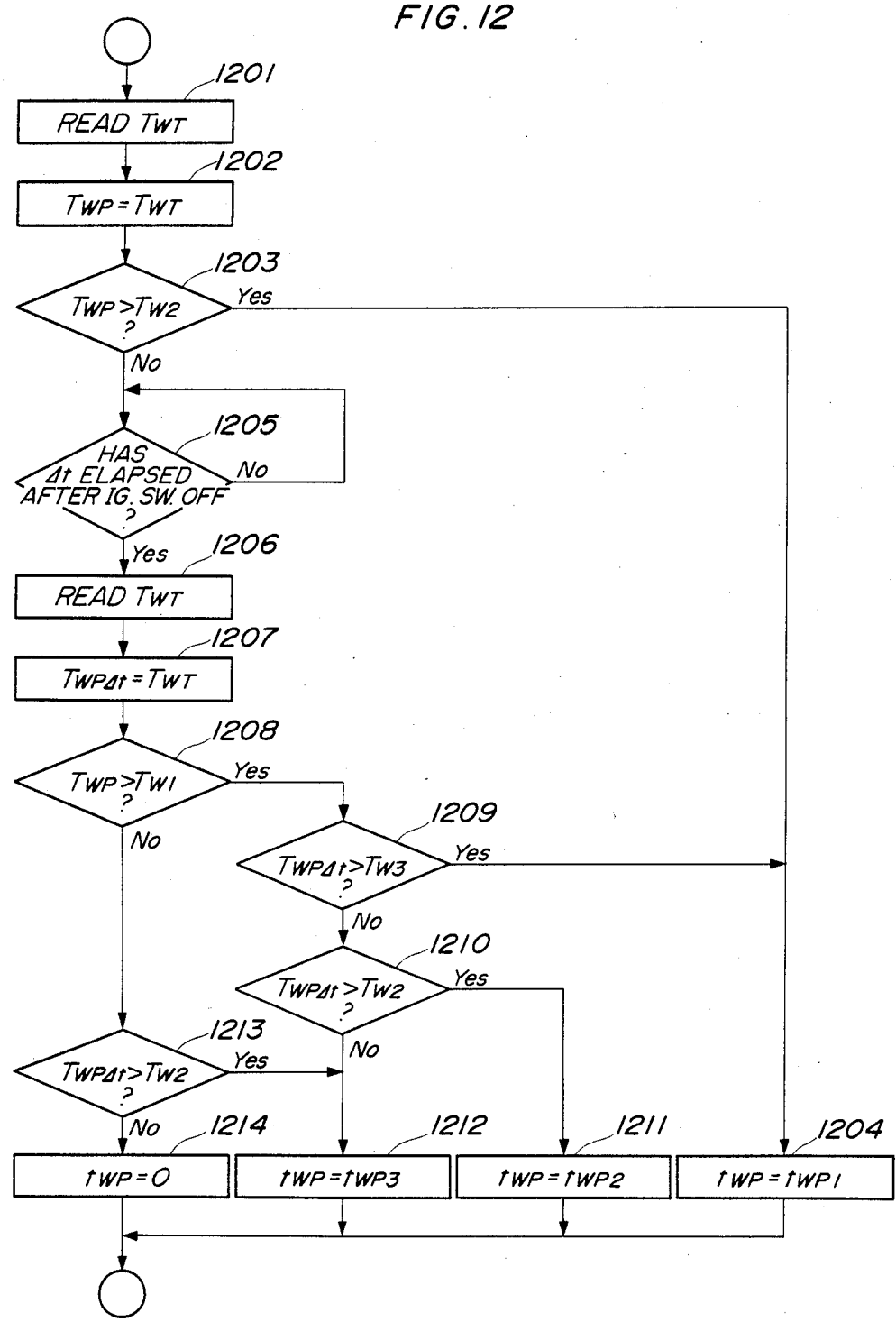
FIG. 12 is a flowchart showing a subroutine for setting a time period for operating the water pump after stoppage of the engine.

FIG. 12 shows a subroutine for setting the predetermined time period $t_{WP}$ for operating the water pump 20 after stoppage of the engine 1.

According to this embodiment, the water pump 20 is driven in accordance with the manner of increase in the actual temperature of the turbocharger 40 after stoppage of the engine 1. This program is carried out only once immediately after stoppage of the engine.

First, at a step 1201, the turbocharger coolant temperature $T_{WT}$ detected and outputted by the $T_{WT}$ sensor 24 is read, and then at a step 1202, the read value of $T_{WT}$ is set as a coolant temperature $T_{WP}$ on stoppage of the engine (hereinafter referred to as "the coolant temperature on stoppage").

Figure 13:
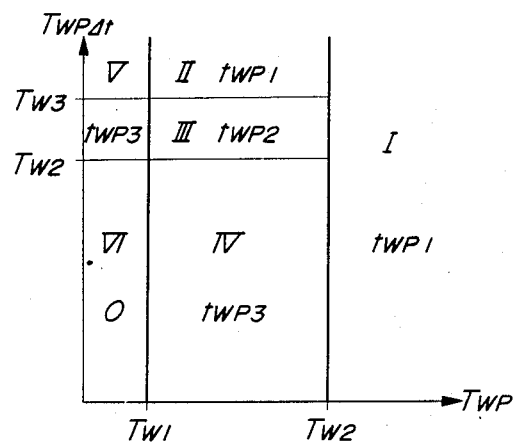
FIG. 13 is a diagram useful in explaining the subroutine of FIG. 12, which shows regions determined by cooling water temperature $T_{WP}$ on the stoppage of the engine and cooling water temperature $T_{WP\Delta t}$ after stoppage of the engine for setting an operating time period of the water pump.

Then, it is determined at a step 1203 whether or not the coolant temperature on stoppage $T_{WP}$ is higher than a second predetermined value $T_{W2}$ (e.g. 105° C.) If the answer at the step 1203 is Yes, i.e. if $T_{WP} > T_{W2}$ (Region I in FIG. 13) and therefore the coolant temperature $T_{WP}$ is high or extremely high, the time period $t_{WP}$ is set to a first predetermined time period $t_{WP1}$ (e.g. 5 minutes) at a step 1204 to thereby cause the water pump 20 to operate over the first predetermined time period $t_{WP1}$, followed by terminating the present program.

If the answer at the step 1203 is No, i.e. if $T_{WP} \leq T_{W2}$, it is determined at a step 1205 whether or not a predetermined time period $\Delta t$ (e.g. 1 minute) has elapsed after the ignition switch has been turned off. If the answer at the step 1205 is Yes, the turbocharger coolant temperature $T_{WT}$ is read again at a step 1206, and then at a step 1207 the read $T_{WT}$ is set as a coolant temperature $T_{WP\Delta t}$ at the time the predetermined time period has elapsed after stoppage of the engine (hereinafter referred to as "the coolant temperature after stoppage").

Then, it is determined at a step 1208 whether or not the coolant temperature on stoppage $T_{WP}$ is higher than a first predetermined value $T_{W1}$ (e.g. 95° C.) which is lower than the second predetermined value $T_{W2}$. If the answer at the step 1208 is Yes, it is determined at a step 1209 whether or not the coolant temperature after stoppage $T_{WP\Delta t}$ is higher than a third predetermined value $T_{W3}$ (e.g. 115° C.) which is higher than the second predetermined value $T_{W2}$. If the answer at the step 1209 is Yes, i.e. if $T_{W1} < T_{WP} \leq T_{W2}$ and $T_{WP\Delta t} > T_{W3}$ (Region II in FIG. 13) and therefore the coolant temperature on stoppage $T_{WP}$ is medium and the coolant temperature after stoppage $T_{WP\Delta t}$ is extremely high, the step 1204 is executed, followed by terminating the present program.

If the answer at the step 1209 is No, it is determined at a step 1210 whether or not the coolant temperature after stoppage $T_{WP\Delta t}$ is higher than the second predetermined value $T_{W2}$. If the answer at the step 1210 is Yes, i.e. if $T_{W1} < T_{WP} \leq T_{W2}$ and $T_{W2} < T_{WP\Delta t} \leq T_{W3}$ (Region III in FIG. 13) and therefore the coolant temperature on stoppage $T_{WP}$ is medium and the coolant temperature after stoppage $T_{WP\Delta t}$ is high, the time period for operating the water pump 20 is set to a second predetermined time period $t_{WP2}$ (e.g. 4 minutes) which is shorter than the first predetermined time period $t_{WP1}$ (step 1211), followed by terminating the present program.

If the answer at the step 1210 is No, i.e. if $T_{W1} < T_{WP} \leq T_{W2}$ and $T_{WP\Delta t} \leq T_{W2}$ (Region IV of FIG. 13) and therefore the coolant temperature on stoppage $T_{WP}$ is medium and the coolant temperature after stoppage $T_{WP\Delta t}$ is low or medium, the time period $t_{WP}$ for operating the water pump 20 is set to a third predetermined time period $t_{WP3}$ (e.g. 3 minutes) which is shorter than the second predetermined time period $t_{WP2}$ (step 1212), followed by terminating the present program.

If the answer at the step 1208 is No, similarly to the step 1210, it is determined at a step 1213 whether or not the coolant temperature after stoppage $T_{WP\Delta t}$ is higher than the second predetermined value $T_{W2}$. If the answer at the step 1213 is Yes, i.e. if $T_{WP} \leq T_{W1}$ and $T_{WP\Delta t} > T_{W2}$ (Region V in FIG. 13) and therefore the coolant temperature on stoppage $T_{WP}$ is low and the coolant temperature after stoppage $T_{WP\Delta t}$ is high or extremely high, the step 1212 is executed, followed by terminating the present program.

If the answer at the step 1213 is No, i.e. if $T_{WP} \leq T_{W1}$ and $T_{WP\Delta t} \leq T_{W2}$ (Region VI in FIG. 13) and therefore the coolant temperature on stoppage $T_{WP}$ is low and the coolant temperature after stoppage $T_{WP\Delta t}$ is low or medium, the time period $t_{WP}$ for operating the water pump 20 is set to 0 to thereby stop the water pump 20, followed by terminating the present program.

Thus, according to this embodiment, the manner of increase in the actual temperature of the turbocharger 4 after stoppage of the engine 1, can be simply and accurately determined in accordance with the turbocharger coolant temperature $T_{WT}$ on stoppage of the engine 1 ($T_{WP}$) and the turbocharger coolant temperature $T_{WT}$ at the time the predetermined time period has elapsed after stoppage of the engine 1 ($T_{WP\Delta t}$). The time period $t_{WP}$ for operating the water pump 20 is, as described above, set to a longer value as the coolant temperature on stoppage $T_{WP}$ is higher and the coolant temperature after stoppage $T_{WP\Delta t}$ is higher. Therefore, the water pump 20 can be operated to just a sufficient extent depending on the manner of actual increase in the temperature of the turbocharger 4 after stoppage of the engine 1, whereby it is possible to prevent thermal damage to the turbocharger 4 and also to carry out efficient cooling without wasting electricity stored in the battery.

In addition, in the above embodiment, the turbocharger coolant temperature $T_{WT}$ or the temperature of coolant for cooling the turbocharger is used as a parameter for setting the time period $t_{WP}$ for operating the water pump 20. However, this is not limitative, and similar effects can also be obtained, for example, by the use of the engine coolant temperature $T_{WE1}$.

Figure 14:
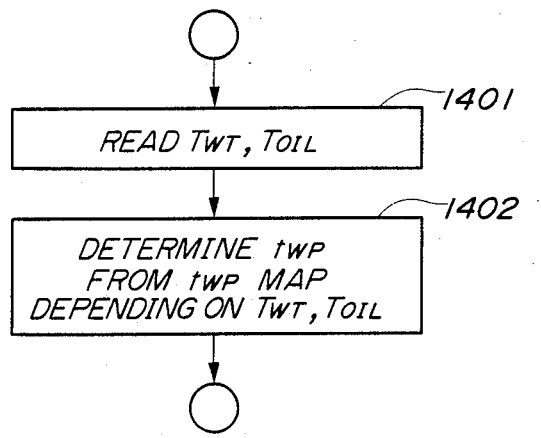
FIG. 14 is a flowchart showing another example of the subroutine for setting a time period for operating the water pump.

FIG. 14 is another embodiment of the manner of setting the time period $t_{WP}$ for operating the water pump 20 after stoppage of the engine 1. This program is executed only once immediately after stoppage of the engine 1.

First, at a step 1401, the turbocharger coolant temperature $T_{WT}$ is read from a signal supplied by the $T_{WT}$ sensor 24, and the lubricating oil temperature $T_{OIL}$ from a signal supplied by the $T_{OIL}$ sensor 16, respectively. Then, at a step 1402, depending on the $T_{WT}$ value and the $T_{OIL}$ value read at the step 1401, the time period $t_{WP}$ for operating the water pump 20 is determined based on a $t_{WP}$ map stored in the ECCU 15 to thereby cause the water pump 20 to operate over the determined time period $t_{WP}$ followed by terminating the present program.

Figure 15:
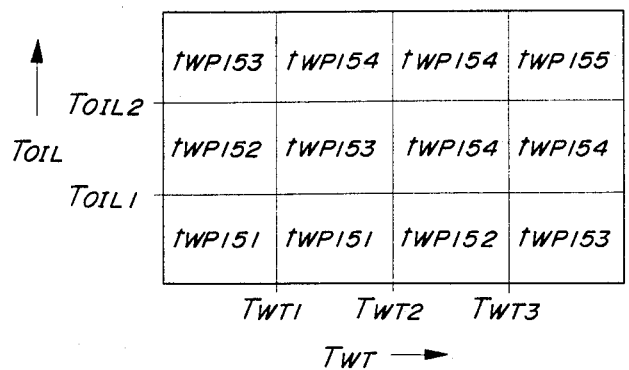
FIG. 15 is a diagram showing a $t_{WP}$ map which is applied to the subroutine of FIG. 14

FIG. 15 shows the aforesaid $t_{WP}$ map. As is shown in the figure, the $t_{WP}$ map is divided into twelve regions by three predetermined $T_{WT}$ values, $T_{WT1}$, $T_{WT2}$ and $T_{WT3}$ (e.g. 90° C., 95° C., and 100° C., respectively), and two predetermined $T_{OIL}$ values, $T_{OIL1}$ and $T_{OIL2}$ (e.g. 100° C. and 105° C., respectively). For each of the twelve regions, there is set one of the time periods $t_{WP}$ $t_{WP151}$ to $t_{WP155}$ (e.g. 0, 3, 5, 6, and 8 minutes, respectively).

As is clear from the figure, the time period $t_{WP}$ is set to a longer value as the turbocharger coolant temperature $T_{WT}$ is higher and the lubricating oil temperature $T_{OIL}$ is higher. The $t_{WP}$ is set depending not only on the turbocharger coolant temperature $T_{WT}$ but also on the lubricating oil temperature $T_{OIL}$ since the turbocharger coolant temperature $T_{WT}$ represents the temperature of the turbocharger on stoppage of the engine 1 which reflects external factors such as air streams produced by running of the vehicle; because of the small specific heat of the coolant, whereas the lubricating oil temperature $T_{OIL}$ is not influenced by external factors but only by the load on the engine 1 immediately before stoppage thereof because of the large specific heat of the lubricating oil. Therefore, according to this embodiment, by setting the time period $t_{WP}$ depending on the turbocharger coolant temperature $T_{WT}$ and the lubricating oil temperature $T_{OIL}$ as described above, it is possible to take into consideration both external factors and the load on the engine 1 immediately before stoppage thereof to thereby drive the water pump 20 to just a sufficient extent in accordance with rise in the temperature of the turbocharger after stoppage of the engine 1. This makes it possible not only to prevent thermal damage to the turbocharger 4 such as seizure of the bearing parts and degradation in the lubricity due to carbonization of lubricating oil but also to carry out efficient cooling without wasting electricity stored in the battery.

Further, in this embodiment as well, it is possible to obtain similar effects by detecting the lubricating oil temperature $T_{OIL}$ in the vicinity of the turbocharger 4.

Also, in this embodiment, the turbocharger coolant temperature $T_{WT}$ is used as one of the parameters for setting the time period $t_{WP}$ for operating the water pump 20. However, similar effects can be obtained by replacing the turbocharger coolant temperature $T_{WT}$ by the engine coolant temperature $T_{WE1}$ and replacing the values of $t_{WP151}$ to $t_{WP155}$ shown in FIG. 15 by suitable values of the engine coolant temperature $T_{WE1}$.

Further, the operation of the water pump 20 may be continuously carried out over the set time period $t_{WP}$ after stoppage of the engine 1, or may be intermittently carried out within the time period $t_{WP}$. In the latter case, during stoppage of the water pump, the turbocharger 4 can also be cooled by heat loss due to vaporization of coolant, whereby cooling can be carried out more effectively.

Figure 16:
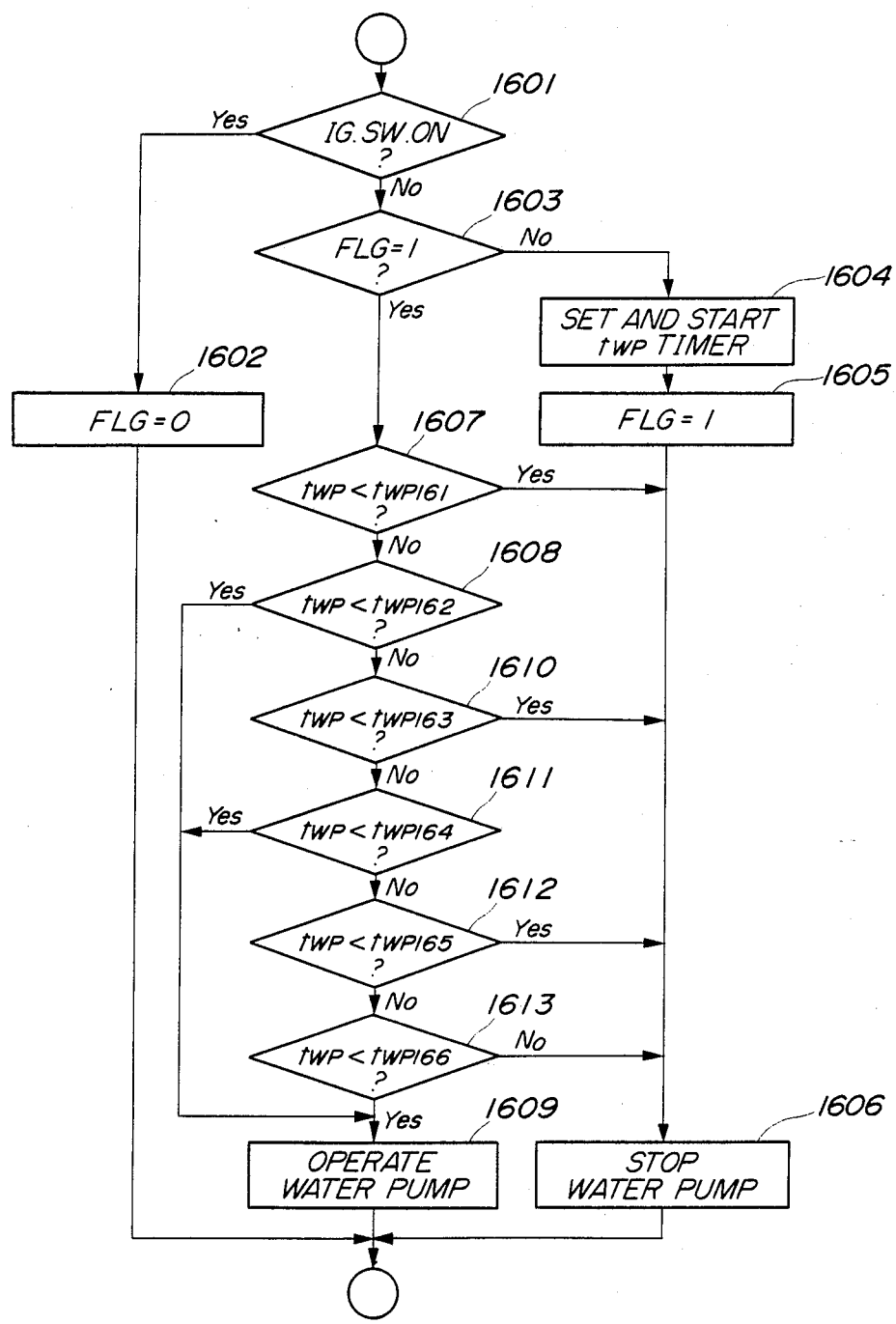
FIG. 16 is a flowchart showing a subroutine for controlling the intermittent operation of the water pump after stoppage of the engine.

FIGS. 16 and 17 show an embodiment of the invention in which the water pump 20 is intermittently operated.

FIG. 16 shows a subroutine executed by the ECCU 15 for controlling the intermittent operation of the water pump 20. This program is carried out at predetermined constant time intervals.

Steps 1601 to 1603 of FIG. 16 are the same as the steps 1001 to 1003 of FIGS. 10 and 11. Therefore, description thereof is omitted. In FIG. 16, if the answer at the step 1603 is No, i.e. if the flag FLG has been set to 0 and therefore the present loop is the first loop after stoppage of the engine 1, a $t_{WP}$ timer, not shown, which is provided in the ECCU 15 and comprises an up-counter, is started (step 1604), and at a step 1605, the flag FLG is set to a value of 1. Then the water pump 20 is controlled to stoppage (step 1606), followed by terminating the present program.

If the answer at the step 1603 is Yes, i.e. if the flag FLG has been set to 1 and therefore the present loop is one of the second and following loops after stoppage of the engine 1, it is determined at a step 1607 whether or not the tWP counted by the $t_{WP}$ timer is smaller than a first predetermined value $t_{WP161}$ (e.g. 2 minutes). If the answer at the step 1607 is Yes, i.e. if $0 \leq t_{WP}21 t_{WP161}$, the above step 1616 is executed to thereby maintain stoppage of the water pump 20, whereas if the answer at the step 1607 is No, the program proceeds to a step 1608.

At the step 1608, it is determined whether or not the $t_{WP}$ counted by the $t_{WP}$ timer is smaller than a second predetermined value $t_{WP162}$ (e.g. 4 minutes) which is larger than the first predetermined value $t_{WP161}$. If the answer at the step 1608 is Yes, i.e. if $t_{WP161} \leq t_{WP} < t_{WP162}$, the water pump 20 is controlled to operation (step 1609), followed by terminating the present program.

Similarly, it is determined at the following steps 1610 to 1613 whether or not the $t_{WP}$ counted by the $t_{WP}$ timer is smaller than third, fourth, fifth, and sixth predetermined values, $t_{WP163}$, $t_{WP164}$, $t_{WP165}$, and $t_{WP166}$ (e.g. 6, 9, 14, and 15 minutes, respectively). If the answer at the step 1610 or 1612 is Yes, i.e. if $t_{WP162} \leq t_{WP}21 t_{WP163}$ or $t_{WP164} \leq t_{WP} < t_{WP165}$, the step 1606 is executed. If the answer at the step 1611 or 1613 is Yes, i.e. if $t_{WP163} \leq t_{WP} < t_{WP164}$ or $t_{WP165} \leq t_{WP} < t_{WP166}$, the step 1609 is executed, followed by terminating the present program. Further, if the answer at the step 1613 is No, i.e. if $t_{WP} \geq t_{WP166}$, the step 1606 is executed, followed by terminating the present program.

According to the above-described cooling control, as shown in (b) of FIG. 17, the water pump 20 is stopped when the $t_{WP}$ counted by the tWP timer falls within $0 \leq t_{WP} < t_{WP161}$, $t_{WP162} \leq t_{WP} < t_{WP163}$, $t_{WP164} \leq t_{WP} < t_{WP165}$, or $t_{WP} \geq t_{WP166}$ and is operated when the $t_{WP}$ counted by the $t_{WP}$ timer falls within $t_{WP161} \leq t_{WP} < t_{WP162}$, $t_{WP163} \leq t_{WP} < t_{WP164}$ and $t_{WP165} \leq t_{WP} < t_{WP166}$ whereby the intermittent operation of the water pump 20 is carried out.

FIGS. 17(a), (b) and (c) show the relationship between the operation and stoppage of the water pump 20 and the temperature $T_S$ of the seal ring 64 of the turbocharger 4. The seal ring 64 is most susceptible to seizure. Therefore, if the temperature of the turbocharger can be kept lower than the critical temperature $T_{SL}$ (e.g. 230° C.) above which seizure of the seal ring may occur, other thermal damage such as carbonization of lubricating oil etc. can also be prevented.

More specifically, in the conventional cooling system, the operation of the water pump 20 is continued over a predetermined time period immediately after stoppage of the engine, so that cooling effects through loss of heat due to vaporization of coolant immediately after stoppage of the engine 1 cannot be utilized. Therefore, as shown in FIG. 17(a), even if the water pump 20 is operated over a time period equal to the sum of the water pump-operating time periods of this embodiment of the invention, the seal ring temperature $T_S$ cannot be prevented from rising above the critical temperature $T_{SL}$. In order to keep the seal ring temperature $T_S$ below the critical temperature $T_{SL}$, the water pump 20 must be operated over a longer time period. In addition, the one-dot chain line of FIG. 17(a) indicates transition of the seal ring temperature $T_S$ when the water pump 20 is not at all operated after stoppage of the engine 1.

There is a general tendency that the temperature of the turbocharger does not rapidly rise immediately after stoppage of the engine 1. This is presumably because even if the coolant is not circulated, the turbocharger is cooled to a certain extent by loss of heat due to vaporization of the coolant, since the temperature of the turbocharger is much higher than the boiling point of the coolant. However, the conventional cooling control system, which operates the water pump 20 continuously over the predetermined time period immediately after stoppage of the engine 1, cannot effectively utilize the above-described cooling effects through loss of heat due to vaporization of the coolant, but it results in wasteful consumption of the battery, i.e. inefficient cooling, to the contrary.

In contrast, according to this embodiment of the invention, the water pump 20 is first stopped immediately after the stoppage of the engine 1 ($0 \leq t_{WP} < t_{WP161}$), and thereafter the water pump 20 is intermittently operated, whereby the above-described cooling effects through utilization of loss of heat due to vaporization of the coolant during stoppage of the water pump 20 and the cooling effects through heat exchange between the coolant and the turbocharger 4 during operation of the water pump 20 can be utilized alternately, whereby it is possible to keep the seal ring temperature $T_S$ below the critical temperature $T_{SL}$ without wasting the battery.

Further, the above-described embodiment showing an example of the intermittent operation of the water pump 20 is not limitative, but the invention can be practiced in various other manners. For example, FIG. 17(c) shows an alternative manner in which the water pump 20 is operated when the time period elapsed after stoppage of the engine 1 is within the range of 3 to 6 minutes or 9 to 12 minutes. This also makes it possible to keep the seal ring temperature $T_S$ below the critical temperature $T_{SL}$ to thereby obtain almost the same effects as described above.

FIGS. 18 to 22 show an example of control of operation of the bonnet fan 28 and an example of control of operation of the radiator fan 27 and the bonnet fan 28.

Figure 18:
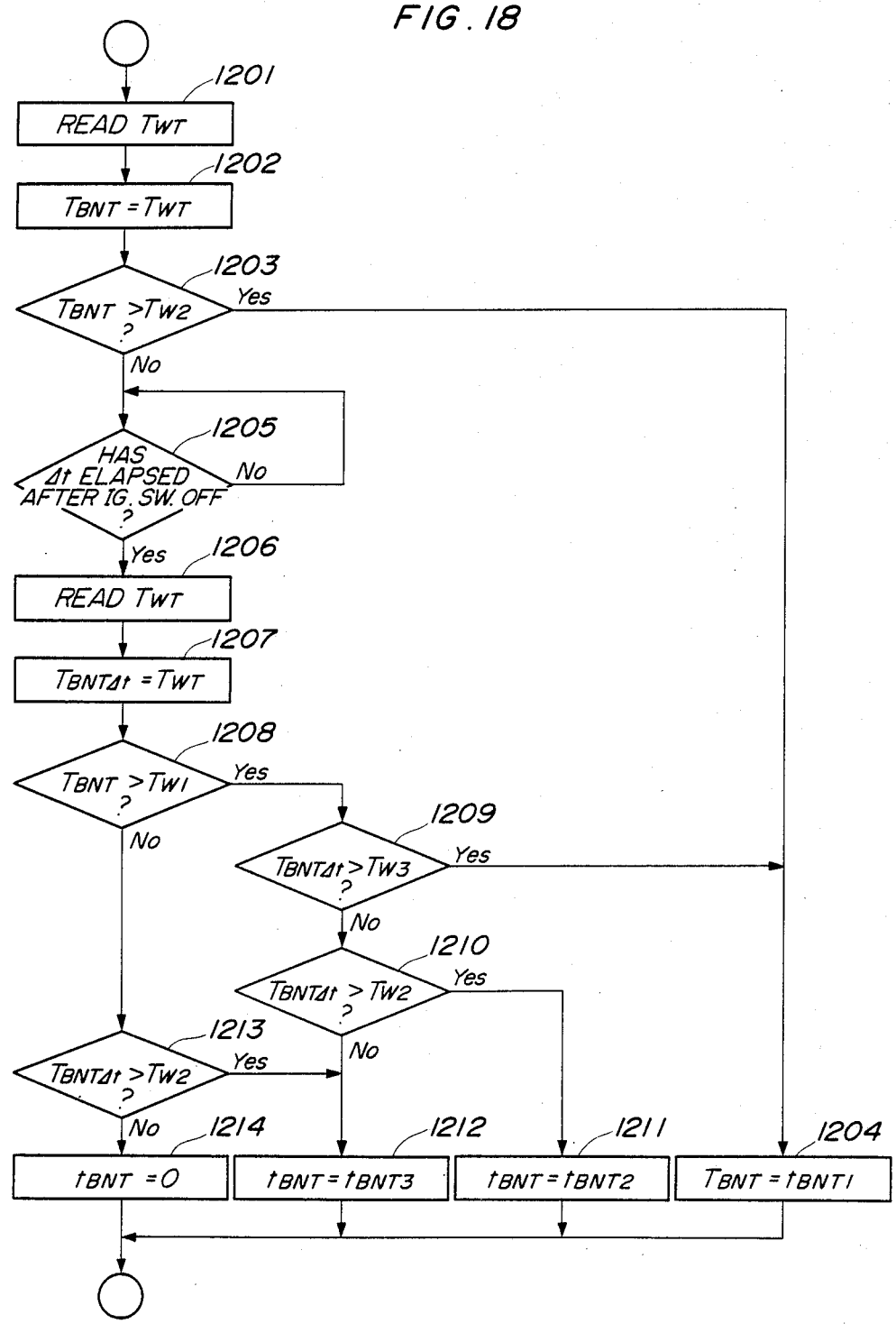
FIG. 18 is a flowchart showing a subroutine for setting a time period for operating a bonnet fan after stoppage of the engine.
Figure 19:
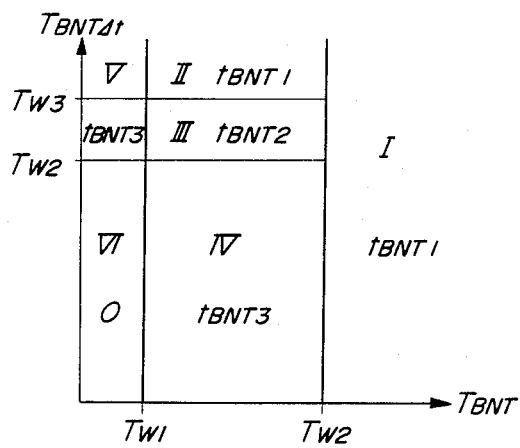
FIG. 19 is a diagram similar to that of FIG. 13, which is useful for explaining the subroutine of FIG. 18 and shows regions determined by cooling water temperature on stoppage of the engine and cooling water temperature after stoppage of the engine.

FIG. 18 shows a subroutine for setting a time period $t_{BNT}$ for operating the bonnet fan 28. This program is executed only once immediately after stoppage of the engine 1.

The program of FIG. 18 is basically similar to that of FIG. 12, like step numbers designate steps corresponding to each other. Detailed description of the same or similar operations is omitted.

In FIG. 18, at a step 1201, the turbocharger coolant temperature $T_{WT}$ supplied from the $T_{WT}$ sensor 24 is set as a coolant temperature $T_{BNT}$ on stoppage of the engine (hereinafter referred to as "the coolant temperature on stoppage"). Then at a step 1203, it is determined whether or not the coolant temperature on stoppage $T_{BNT}$ is higher than a second predetermined value $T_{W2}$. If the answer at the step 1203 is Yes, i.e. if the coolant temperature on stoppage $T_{BNT}$ is high or extremely high (Region I in FIG. 19) a time period $t_{BNT}$ for operating the bonnet fan 28 is set to a first predetermined time period $t_{BNT1}$ (e.g. 12 minutes) (step 1204) to thereby cause the bonnet fan 28 to operate over the first predetermined time period $t_{BNT1}$, followed by terminating the present program.

If the answer at the step 1203 is No, i.e. if $T_{BNT} \leq T_{W2}$, operations similar to those of steps 1205 and 1206 of FIG. 12 are carried out, and then at a step 1207, the turbocharger coolant temperature $T_{WT}$ read again at the step 1206 is set as a coolant temperature $T_{BNT\Delta T}$ at the time the predetermined time period has elapsed after stoppage of the engine (hereinafter referred to as "the coolant temperature after stoppage").

Thus, the turbocharger coolant temperature $T_{WT}$ is read not only on stoppage of the engine 1 but also upon the elapse of the predetermined time period after stoppage of the engine 1. This is because the temperature of the turbocharger 4 on and after stoppage of the engine 1 depends on an operating condition of the engine 1 immediately before stoppage of the engine 1, such as the load on the engine 1 and the ambient air temperature, etc., and further rises in various manners. Therefore, the manner of increase in the turbocharger temperature after stoppage of the engine is detected so as to carry out setting of the time period $t_{BNT}$ for operating the bonnet fan 28 depending thereon, which will be described hereinafter.

Then at a step 1208 et seq., operations similar to those of FIG. 12 are carried out to set the time period for operating the bonnet fan 28. More specifically, in FIG. 18, if the answer at the step 1209 is Yes (Region II in FIG. 19), and therefore the coolant temperature on stoppage $T_{BNT}$ is medium and the coolant temperature after stoppage $T_{BNTAt}$ is extremely high, the step 1204 is executed, followed by terminating the present program.

If the answer at the step 1210 is Yes, and therefore the coolant temperature on stoppage $t_{BNT}$ is medium and the coolant temperature after stoppage $T_{BNTAt}$ is high, the time period $t_{BNT}$ for operating the bonnet fan 28 is set to a second predetermined time period $t_{BNT2}$ (e.g. 9 minutes) which is shorter than the first predetermined time period $t_{BNT1}$ (step 1211), followed by terminating the present program.

If the answer at the step 1210 is No (Region IV in FIG. 19), and therefore the coolant temperature on stoppage $T_{BNT}$ is medium and the coolant temperature after stoppage $T_{BNTAt}$ is low or medium, the time period $t_{BNT}$ is set to a third predetermined time period $t_{BNT3}$ (e.g. 6 minutes) which is shorter than the second predetermined time period $t_{BNT2}$ (step 1212), followed by terminating the present program.

If the answer at the step 1210 is Yes (Region V in FIG. 19), and therefore the coolant temperature on stoppage $T_{BNT}$ is low and the coolant temperature after stoppage $T_{BNTAt}$ is high or extremely high, the step 1212 is executed, followed by terminating the present program.

If the answer at the step 1213 is No (Region VI in FIG. 19), and therefore the coolant temperature on stoppage $T_{BNT}$ is low and the coolant temperature after stoppage $T_{BNTAt}$ is low or medium, the time period $t_{BNT}$ is set to 0 (step 1214) to cause the bonnet fan 28 to stop, followed by terminating the present program.

According to the above-described embodiment, the bonnet fan 28 can be operated to just a sufficient extent depending on the manner of actual rise in the temperature of the turbocharger 4 after stoppage of the engine 1, whereby the temperatures of the turbocharger 4 and the engine room 26 can be properly controlled after stoppage of the engine 1 to thereby prevent thermal damage to the turbocharger 4 and the engine 1, and efficient cooling can be carried out without wasting the battery.

In this embodiment as well, similar effects to those stated before can be obtained even if the turbocharger coolant temperature $T_{WT}$ as a parameter for setting the time period $t_{BNT}$ for operating the bonnet fan 28 is replaced by the engine coolant temperature $T_{WE1}$.

Figure 20:
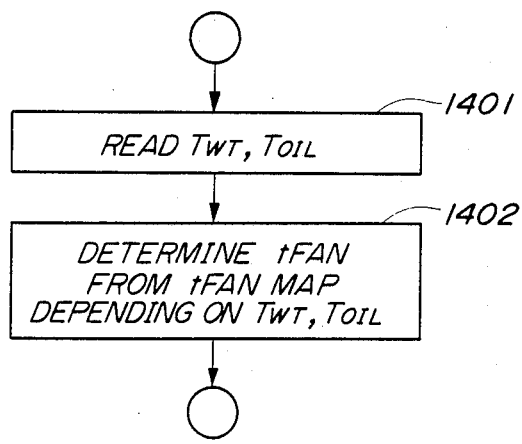
FIG. 20 is a flowchart showing a subroutine similar to that of FIG. 14 for setting operating time periods for a radiator fan and a bonnet fan after stoppage of the engine.

FIG. 20 shows a subroutine for setting a time period $t_{FAN}$ (hereinafter referred to as "the fan-operating time period") for operating the radiator fan 27 and the bonnet fan 28. This program is executed only once immediately after stoppage of the engine 1. According to this cooling control, the radiator fan 27 is driven for reverse rotation to thereby form cooling air streams in the engine room 26 which flow from the bonnet fan 28 through a zone in the vicinity of the engine 1 to the radiator fan 27, as indicated by the arrows in FIG. 2.

In FIG. 20, the steps corresponding to those of FIG. 14 are designated by like step numbers. First, the turbocharger coolant temperature $T_{WT}$ and the lubricating oil temperature $T_{OIL}$ are read at a step 1401. Then at a step 1402, in accordance with the read temperature values, the fan-operating time period $t_{FAN}$ is determined based on a $t_{FAN}$ map stored in the ECCU 15 to thereby cause the radiator fan 27 and the bonnet fan 28 to operate at the same time over the fan operating time period $t_{FAN}$ followed by terminating the present program.

Figure 21:
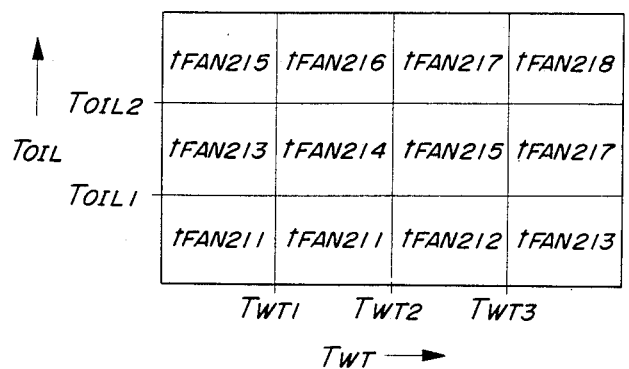
FIG. 21 is a $t_{FAN}$ map similar to the map of FIG. 15, which is applied to the subroutine of FIG. 20 and determined by engine cooling water temperature $T_{WT}$ and lubricating oil temperature $T_{OIL}$.

FIG. 21 shows the aforesaid $t_{FAN}$ map. Similarly to the $t_{WP}$ map described with reference to FIG. 15, the $t_{FAN}$ map is divided into twelve regions by three predetermined $T_{WT}$ values, $T_{WT1}$, $t_{WT2}$, and $T_{WT3}$, and two predetermined $T_{OIL}$ values, $T_{OIL1}$ and $T_{OIL2}$. For each of the twelve regions, there is set one of the time periods $t_{FAN}$, $t_{FAN211}$ to $t_{FAN281}$ (e.g. 0, 3, 5, 6, 8, 9, 10, and 12 minutes, respectively).

As is clear from the figure, the fan-operating time period $t_{FAN}$ is set to a longer value as the turbocharger coolant temperature $T_{WT}$ is higher and the lubricating oil temperature $T_{OIL}$ is higher. The $t_{FAN}$ is set depending not only on the turbocharger coolant temperature $T_{WT}$ but also on the lubricating oil temperature $T_{OIL}$ for the same reason as described with reference to FIG. 15. Therefore, according to this embodiment, by setting the time period $t_{FAN}$ depending on the turbocharger coolant temperature $T_{WT}$ and the lubricating oil temperature $T_{OIL}$ as described above, it is possible to take into consideration both external factors and the load on the engine 1 immediately before stoppage thereof to thereby drive the radiator fan 27 and the bonnet fan 28 to just a sufficient extent in accordance with rise in the temperature of the turbocharger after stoppage of the engine 1. This makes it possible not only to properly control the temperatures of the turbocharger 4 and the engine room to thereby prevent thermal damage to the turbocharger 4 and the engine 1 but also to carry out efficient cooling without wasting the battery.

Further, in this embodiment, the operation of the radiator fan 27 and that of the bonnet fan 28 are carried out synchronously. However, this is not limitative, but the fans 27 and 28 may be operated over different time periods respectively set in accordance with the maps which are similar to that of FIG. 21 and separately provided.

Further, in this embodiment as well, it is possible to obtain similar effects to those stated above by detecting the lubricating oil temperature $T_{OIL}$ in the vicinity of the turbocharger 4.

Also, in this embodiment, the turbocharger coolant temperature $T_{WT}$ is used as one of the parameters for setting the fan-operating time period $t_{FAN}$ for operating the radiator fan 27 and the bonnet fan 28. However, similar effects can be obtained by replacing the turbocharger coolant temperature $T_{WT}$ by the engine coolant temperature $T_{WE1}$ and replacing the values of $t_{FAN211}$ to $t_{FAN218}$ shown in FIG. 21 by suitable values of the temperature $T_{WE1}$.

Figure 22:
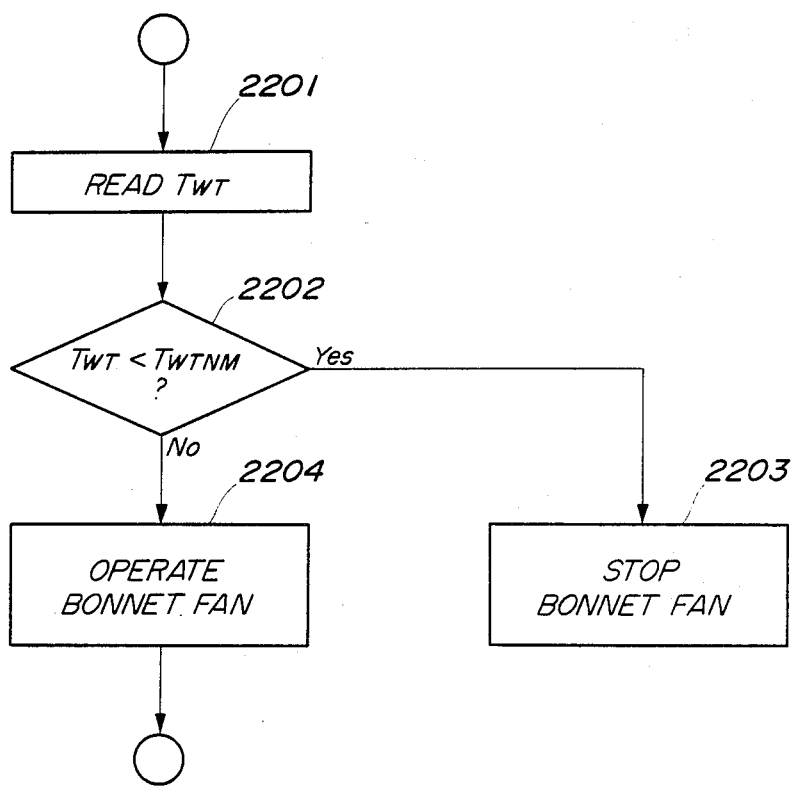
FIG. 22 is a flowchart showing a subroutine for forcedly air-cooling by the bonnet fan during operation of the engine.

FIG. 22 shows another embodiment of the invention for controlling the operation of the bonnet fan 28.

According to the embodiment, when the turbocharger temperature rises, cooling is started in advance even during operation of the engine 1 to thereby properly avoid a rise in the temperature of the turbocharger 4 and that of the engine room accommodating the turbocharger 4.

A subroutine shown in FIG. 22 is executed by the CPU of the ECCU 15 for controlling forced air-cooling by the bonnet fan 28. This program is carried out during operation of the engine 1 in synchronism with generation of TDC signal pulses or in asynchronism therewith, i.e. at predetermined constant time intervals.

First, at a step 2201, the turbocharger coolant temperature $T_{WT}$ reflecting the turbocharger temperature is read, and then it is determined at a step 2202 whether or not the $T_{WT}$ is lower than a predetermined value $T_{WTNM}$. The predetermined value $T_{WTNM}$ is for judging whether or not the bonnet fan 28 provided in the engine room 26 for air-cooling of same should be forcedly operated, and it is set at a value approximate to an upper limit value (e.g. 95° C.) which can be normally assumed by the turbocharger coolant temperature $T_{WT}$.

If the answer at the step 2202 is Yes, the forced driving of the bonnet fan 28 is not carried out (step 2203), followed by terminating the present program.

If the answer at the step 2202 is No, i.e. if $T_{WT} \geq T_{WTNM}$, the bonnet fan 28 is driven by the motor 30 (step 2204) to thereby start forced air-cooling (ventilation by the bonnet fan 28 in addition to water-cooling by the cooling system 23 for the turbocharger 4. The forced air-cooling is continued so long as the turbocharger coolant temperature $T_{WT}$ is equal to or higher than the predetermined value $T_{WTNM}$. As described hereinabove, during operation of the engine 1, the water pump 20 in the cooling system 23 for the turbocharger 4 is controlled by the ECU 9, and therefore the turbocharger 4 is cooled by circulating coolant. However, if the $T_{WT}$ exceeds the $T_{WTNM}$ the forced air-cooling as described above is additionally carried out before the turbocharger temperature becomes extremely high, whereby the temperature of the turbocharger itself and that of the engine room accommodating same can be properly controlled.

More specifically, forced air-cooling can be carried out by driving the bonnet fan 28 from the time point where the $T_{WT}$ has risen to a certain degree, even if the ignition switch 25 is ON, i.e. during operation of the engine 1. Therefore, the forced air-cooling can be started in advance before the turbocharger 4 is stopped after the engine has been under a heavily-loaded condition. For example, if the vehicle is stopped after cruising at a speed of 100 km/h, the turbocharger coolant temperature $T_{WT}$ will rise above an upper limit value for normal operation, e.g. to approximately 98° C. Thereafter, the turbocharger temperature tends to keep high or even rise. However, by virtue of the above-described forced air-cooling by the bonnet fan 28 depending on the $T_{WT}$ cooling can be started earlier, whereby it is possible to effectively cool the turbocharger 4, one of the main heat sources in the engine room, and avoid a rise in the engine room temperature, to thereby properly control the temperature of the main body of the turbocharger 4 and that of the engine room accommodating same.

What is claimed is:

1. A cooling control system for an internal combustion engine having a supercharger, an engine room accommodating said supercharger, a first cooling system for cooling said engine, and a second cooling system for cooling said supercharger, comprising:
    first sensor means for detecting stoppage of said engine;
    second sensor means comprising first temperature detecting means for detecting the temperature of coolant at a location downstream of said supercharger in said second cooling system, and second temperature detecting means for detecting a temperature representative of said engine in said first cooling system;
    pump means for supplying coolant for cooling said supercharger to said second cooling system;
    pump driving means for electrically driving said pump means;
    cooling fan means arranged in said engine room;
    fan driving means for electrically driving said cooling fan means;
    timer means for determining whether or not at least one predetermined time period has elapsed; and
    control means for controlling at least one of said pump driving means and said fan driving means in a manner such that operation of said pump means and operation of said cooling fan means are controlled based on a result of detection by said first and second sensor means and a result of determination by said timer means, said control means operating said pump driving means when the temperature detected by one of said first and second temperature detecting means of said second sensor means is above a predetermined value.

2. A cooling control system according to claim 1, wherein said second temperature detecting means of said second sensor means detects the temperature of coolant in said first cooling system.

3. A cooling system according to claim 1, including means for operating said timer means in a manner such that said timer means counts a predetermined time period after said first sensor means has detected stoppage of said engine, and means for controlling said pump driving means in a manner such that said pump means is intermittently driven in accordance with said counting by said timer means.

4. A cooling control system according to claim 1, wherein said second sensor means includes third temperature detecting means for detecting the temperature of lubricating oil in said engine said control means operating said pump driving means when the temperature detected by one of said first, second, and third temperature detecting means is above a predetermined value.

5. A cooling control system according to claim 1 or claim 4, wherein said timer means starts counting a predetermined time period when said first sensor means has detected stoppage of said engine,
    said control means operating said pump driving means over said predetermined time period which is counted by said timer means when the temperature detected by said second sensor means is above a predetermined value.

6. A cooling control system according to claim 1, wherein said control means controls said pump driving means in accordance with both an output from said first temperature detecting means of said second sensor means obtained at the time said first sensor means detects stoppage of said engine and an output from said first temperature detecting means obtained at the time a predetermined time period has elapsed after said stoppage of said engine.

7. A cooling control system according to claim 1, wherein operation of said engine is controlled by second control means,
    said first-mentioned control means being capable of carrying out control of said pump driving means and said fan driving means independently of said second control means after stoppage of said engine.

8. A cooling control system according to claim 1, wherein said cooling fan means includes a radiator fan for cooling said engine.

9. A cooling control system according to claim 8, wherein said control means causes said radiator fan to rotate in a direction such that air in said engine room is discharged in a forward direction to the outside thereof.

10. A cooling control system according to claim 1, wherein said cooling fan means comprises a radiator fan for cooling said engine, and a cooling fan for cooling said engine room.

11. A cooling control system according to claim 10, including second sensor means for detecting a parameter representative of a temperature of a predetermined system of said engine,
    said control means operating said cooling fan in accordance with an output from said second sensor means.

12. A cooling control system according to claim 11, wherein said engine has a cooling system for cooling said supercharger,
    said second sensor means comprising coolant temperature detecting means for detecting the temperature of said coolant at a location downstream of said supercharger in said cooling system,
    said control means controlling said fan driving means in accordance with both an output from said coolant temperature detecting means at the time said first-mentioned sensor means detects stoppage of said engine and an output from said coolant temperature detecting means at the time a predetermined time period has elapsed after detection of said stoppage of said engine.

13. A cooling control system according to claim 11, wherein said engine has a cooling system for cooling said supercharger,
    said second sensor means comprising coolant temperature detecting means for detecting the temperature of said coolant at a location downstream of said supercharger in said cooling system,
    said control means including means for controlling said fan driving means during operation of said engine such that said cooling fan starts cooling in advance before stoppage of said engine when the temperature of said coolant detected by said coolant temperature detecting means is above a predetermined value.

14. A cooling control system according to claim 7, wherein said second control means comprises engine output control means for controlling the output of said engine,
said first-mentioned control means being associated with said engine output control means in a manner such that said first-mentioned control means supplies said engine output control means with a predetermined fail-safe signal when abnormality occurs in said cooling control system,
said engine output control means being responsive to said predetermined fail-safe signal for controlling the output of said engine in a manner such that the output of said engine is decreased.

15. A cooling control system according to claim 7 or claim 14, including fail-safe means operable when abnormality occurs in said first-mentioned control means, for operating said fan driving means to drive said cooling fan means.

16. A cooling control system according to claim 14, wherein said engine output control means decreases the output of said engine by cutting off the supply of fuel to said engine.

17. A cooling control system according to claim 14, wherein said engine output control means decreases the output of said engine by retarding the timing of ignition of an ignition device of said engine.

18. A cooling control system according to claim 14, wherein said engine output control means decreases the output of said engine by decreasing supercharging pressure produced by said supercharger.

19. A cooling control system according to claim 18, including temperature detecting means for detecting a parameter representative of a temperature of a predetermined system of said engine,
said first-mentioned control means outputs said predetermined fail-safe signal when abnormality occurs in said temperature detecting means.

20. A cooling control system according to claim 18, wherein said first-mentioned control means supplies said predetermined fail-safe signal when abnormality occurs in at least one of said pump means and said cooling fan means.

21. A cooling control system for an internal combustion engine having a supercharger, an engine room accommodating said supercharger, a first cooling system for cooling said engine, and a second cooling system for cooling said supercharger, comprising:
first sensor means for detecting stoppage of said engine;
second sensor means comprising first temperature detecting means for detecting the temperature of said coolant at a location downstream of said supercharger in said second cooling system, and second temperature detecting means for detecting the temperature of lubricating oil in said engine;
pump means for supplying coolant for cooling said supercharger to said second cooling system;
pump driving means for electrically driving said pump means;
cooling fan means arranged in said engine room;
fan driving means for electrically driving said cooling fan means;
timer means for determining whether or not at least one predetermined time period has elapsed; and
control means for controlling at least one of said pump driving means and said fan driving means in a manner such that operation of said pump means and operation of said cooling fan means are controlled based on a result of detection by said first and second sensor means and a result of determination by said timer means, said control means controlling said pump driving means in accordance with outputs of said first and second temperature detecting means of said second sensor means.

22. A cooling control system for an internal combustion engine having a supercharger, an engine room accommodating said supercharger, a first cooling system for cooling said engine, and a second cooling system for cooling said supercharger, comprising:
first sensor means for detecting stoppage of said engine;
second sensor means comprising first temperature detecting means for detecting the temperature of said coolant at a location downstream of said supercharger in said second cooling system, and second temperature detecting means for detecting the temperature of lubricating oil in said engine;
pump means for supplying coolant for cooling said supercharger to said second cooling system;
pump driving means for electrically driving said pump means;
cooling fan means comprising a first cooling fan comprising a radiator fan arranged at a first location in said engine room for cooling said engine, and a second cooling fan arranged at a second location in said engine room;
fan driving means comprising first and second fan driving means for electrically driving said first and second cooling fans respectively;
timer means for detecting whether or not at least one predetermined time period has elapsed; and
control means for controlling at least one of said pump driving means and said fan driving means in a manner such that operation of said pump means and operation of said cooling fan means are controlled based on a result of detection by said first and second sensor means and a result of determination by said timer means, said control means controlling said first and second fan driving means in accordance with outputs of said first and second temperature detecting means of said second sensor means after said first sensor means detects a stoppage of said engine.

23. A cooling control system according to claim 1 or claim 21, including fail-safe means operable to cause at least one of said pump means and said cooling fan means to operate when abnormality occurs in at least one of said second sensor means and said control means.

24. A cooling control system according to claim 23, wherein said cooling fan means includes a radiator fan for cooling said engine.

25. A cooling control system according to claim 23, wherein said cooling fan means comprises a radiator fan for cooling said engine, and a cooling fan for cooling said engine room.

26. A cooling control system for an internal combustion engine having a supercharger, an engine room accommodating said supercharger, a first cooling system for cooling said engine, and a second cooling system for cooling said supercharger, comprising:

first sensor means for detecting stoppage of said engine;
second sensor means comprising first coolant temperature detecting means for detecting the temperature of coolant at a location downstream of said supercharger in said second cooling system, and second coolant temperature detecting means for detecting the temperature of coolant in said first cooling system for cooling said engine;
pump means for supplying coolant for cooling said supercharger to said second cooling system;
pump driving means for electrically driving said pump means;
cooling fan means arranged in said engine room;
fan driving means for electrically driving said cooling fan means;
timer means for determining whether or not at least one predetermined time period has elapsed; and
control means for controlling at least one of said pump driving means and said fan driving means in a manner such that operation of said pump means and operation of said cooling fan means are controlled based on a result of detection by said first and second sensor means and a result of determination by said timer means, said control means operating said pump driving means when coolant temperature detected by one of said first and second coolant temperature detecting means is above a predetermined value.

27. A cooling control system according to claim 26, wherein said timer means starts counting a predetermined time period when said first sensor means has detected stoppage of said engine,
said control means operating said pump driving means over said predetermined time period which is counted by said timer means when the temperature detected by said second sensor means is above a predetermined value.

28. A cooling control system for an internal combustion engine having a supercharger, an engine room accommodating said supercharger, a first cooling system for cooling said engine, and a second cooling system for cooling said supercharger, comprising:
first sensor means for detecting stoppage of said engine;
second sensor means for detecting the temperature of lubricating oil in said engine;
pump means for supplying coolant for cooling said supercharger to said second cooling system;
pump driving means for electrically driving said pump means;
cooling fan means arranged in said engine room;
fan driving means for electrically driving said cooling fan means;
timer means for determining whether or not at least one predetermined time period has elapsed wherein said timer means starts counting a predetermined time period when said first sensor means has detected stoppage of said engine; and
control means for controlling said pump driving means and said fan driving means in a manner such that operation of said pump means and operation of said cooling fan means are controlled based on a result of detection by said first and second sensor means and a result of determination by said timer means, said control means operating said pump driving means over said predetermined time period which is counted by said timer means when the temperature detected by said second sensor means is above a predetermined value.

* * * * *